(12) United States Patent
Hauru et al.

(10) Patent No.: US 11,289,998 B2
(45) Date of Patent: Mar. 29, 2022

(54) CURRENT LIMITING TECHNIQUE FOR BUCK CONVERTERS

(71) Applicant: TEXAS INSTRUMENTS INCORPORATED, Dallas, TX (US)

(72) Inventors: Juha Olavi Hauru, Oulu (FI); Ari Kalevi Väänänen, Oulu (FI); Antti Juhani Korhonen, Oulu (FI); Janne Matias Pahkala, Oulu (FI); Jussi Matti Aleksi Särkkä, Oulunsalo (FI)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 36 days.

(21) Appl. No.: 16/945,666

(22) Filed: Jul. 31, 2020

(65) Prior Publication Data

US 2022/0037988 A1 Feb. 3, 2022

(51) Int. Cl.
*H02M 3/158* (2006.01)
*H02M 1/32* (2007.01)
*H02M 3/157* (2006.01)

(52) U.S. Cl.
CPC ............. *H02M 1/32* (2013.01); *H02M 3/157* (2013.01); *H02M 3/158* (2013.01)

(58) Field of Classification Search
CPC ............. H02M 1/0003; H02M 1/0006; H02M 1/0025; H02M 1/0083; H02M 1/32; H02M 3/156; H02M 3/157; H02M 3/158
See application file for complete search history.

(56) References Cited

U.S. PATENT DOCUMENTS

| | | | |
|---|---|---|---|
| 6,580,258 B2 | 6/2003 | Wilcox et al. | |
| 7,019,497 B2 | 3/2006 | Umminger et al. | |
| 7,498,690 B2 | 3/2009 | Sharma | |
| 7,646,185 B2 | 1/2010 | Kim | |
| 7,733,671 B2 | 6/2010 | Chen et al. | |
| 7,906,949 B1 | 3/2011 | Sutardja et al. | |
| 8,698,473 B2 * | 4/2014 | Kimura ............... | H02M 3/1588 323/285 |

(Continued)

FOREIGN PATENT DOCUMENTS

WO WO-2017137996 A1 * 8/2017 .......... H02M 3/1588

OTHER PUBLICATIONS

PCT International Search Report dated Oct. 21, 2021.

*Primary Examiner* — Matthew V Nguyen
(74) *Attorney, Agent, or Firm* — Michael A. Davis, Jr.; Charles A. Brill; Frank D. Cimino

(57) ABSTRACT

In some examples, an apparatus comprises a switching regulator circuit, an output circuit, a duty cycle comparison circuit, a current comparison circuit, and a switching regulator control circuit. The switching regulator circuit switches between first and second voltages. The output circuit has a voltage input and a voltage output and generates a signal based on the first and second voltages. The duty cycle comparison circuit asserts a first signal responsive to a voltage at the voltage output exceeding a product of a multiplier and a reference signal. The current comparison circuit asserts a second signal responsive to a voltage at the voltage input exceeding a first reference voltage and to assert a third signal responsive to the voltage at the voltage input being below a second reference voltage. The switching regulator control circuit controls the switching regulator circuit based on the first, the second, and the third signals.

20 Claims, 10 Drawing Sheets

(56) References Cited

U.S. PATENT DOCUMENTS

| | | | | |
|---|---|---|---|---|
| 8,829,876 B2* | 9/2014 | Michishita | ............ | H02M 3/158 |
| | | | | 323/284 |
| 10,511,234 B2 | 12/2019 | Zhang et al. | | |
| 2012/0229050 A1* | 9/2012 | Yu | ......................... | H02M 3/156 |
| | | | | 315/307 |
| 2016/0204704 A1* | 7/2016 | Cao | ....................... | H02M 3/156 |
| | | | | 323/271 |
| 2021/0232166 A1* | 7/2021 | Feng | ....................... | G05F 1/468 |

* cited by examiner

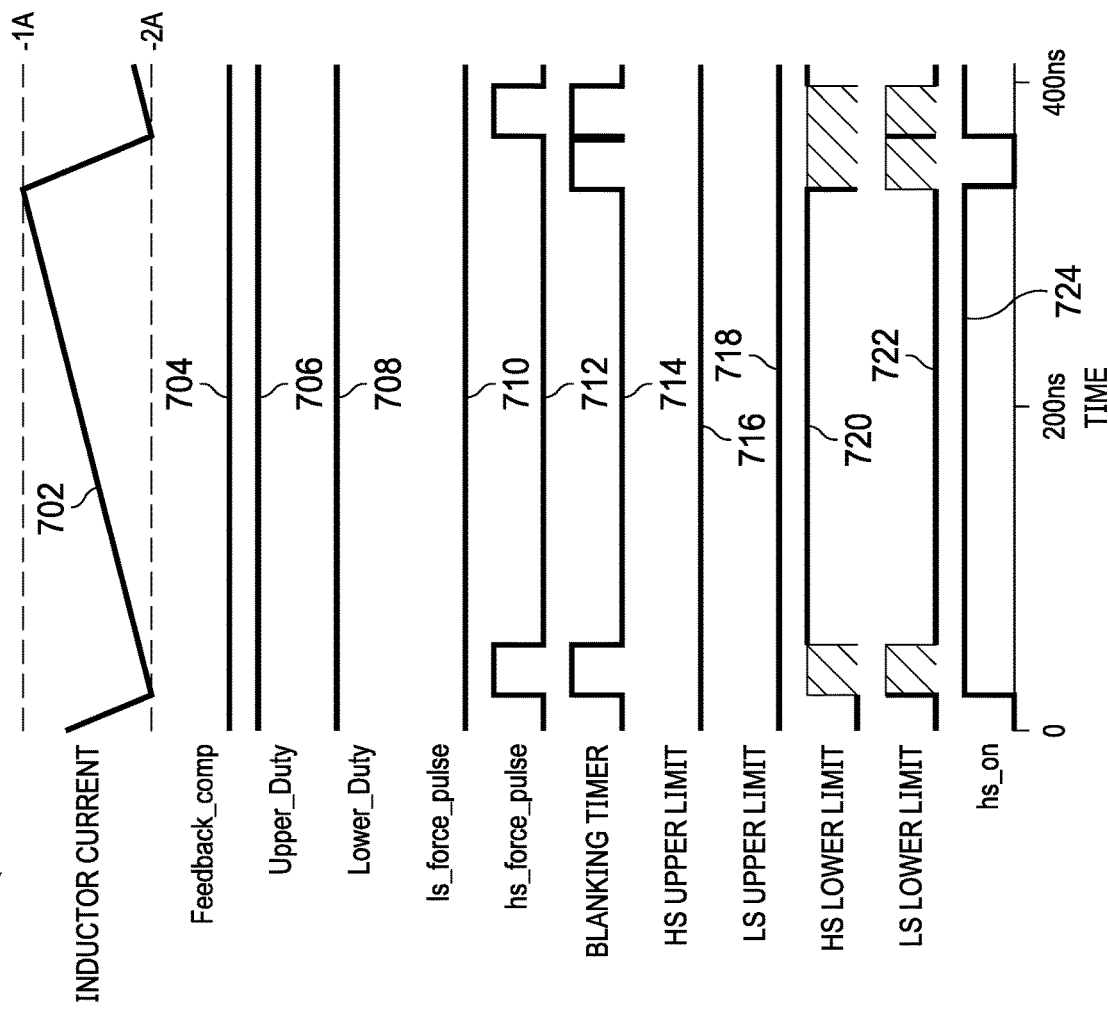

US 11,289,998 B2

CURRENT LIMITING TECHNIQUE FOR BUCK CONVERTERS

BACKGROUND

A power converter steps an input signal up or down to produce an output signal that is suited for the electronic device. For example, a buck converter may produce an output signal that has a lower voltage and a higher current than the input signal received by the buck converter. To accomplish this objective, a power converter may include a switching regulator circuit. A switching regulator circuit includes switches (e.g., transistors) that are rapidly switched on and off to regulate the output signal provided by the power converter.

SUMMARY

In at least one example, an apparatus includes a switching regulator circuit, an output circuit, a duty cycle comparison circuit, a current comparison circuit, and a switching regulator control circuit. The switching regulator circuit has an enable input and a switching output. The output circuit has a voltage input and a voltage output, the voltage input coupled to the switching output. The duty cycle comparison circuit comprises a first comparator, the first comparator having a first comparator input and a first comparator output, the first comparator input coupled to the voltage output. The current comparison circuit comprises a second comparator having a second comparator output and second comparator first and second inputs, the second comparator first input coupled to the voltage input and the second comparator second input configured to receive a first reference voltage. The current comparison circuit also comprises a third comparator having a third comparator output and third comparator first and second inputs, the third comparator first input coupled to the voltage input and the third comparator second input configured to receive a second reference voltage. The switching regulator control circuit has a control output and first, second, and third control inputs, the control output coupled to the enable input and the first, second, and third control inputs coupled to the first, second, and third comparator outputs, respectively.

In another example, a system includes a power source, a load, and a power converter coupled to the power source and the load. The power converter comprises a switching regulator circuit, an output circuit, a duty cycle comparison circuit, a current comparison circuit, and a switching regulator control circuit. The switching regulator circuit has an enable input and a switching output and s configured to switch the switching output between a first voltage and a second voltage. The output circuit has a voltage input and a voltage output. The voltage input is coupled to the switching output. The voltage output is coupled to the load and is configured to supply a voltage to the load. The duty cycle comparison circuit comprises a first comparator. The first comparator has a first comparator output and is configured to indicate whether a voltage provided at the voltage output exceeds a product of a multiplier and a voltage of a reference signal supplied by the power source. The current comparison circuit comprises a second comparator and a third comparator. The second comparator has a second comparator output and is configured to indicate whether a voltage provided at the voltage input exceeds a first reference voltage. The third comparator has a third comparator output and is configured to indicate whether the voltage provided at the input voltage is below a second reference voltage. The switching regulator control circuit has a control output and first, second, and third control inputs. The control output is coupled to the enable input, and the first, second, and third control inputs are coupled to the first, second, and third comparator outputs. The switching regulator control circuit is configured to drive a current of the output circuit between a first current and a second current based on the indications of the first, the second, and the third comparators.

In another example, an apparatus comprises a switching regulator circuit, an output circuit, a duty cycle comparison circuit, a current comparison circuit, and a switching regulator control circuit. The switching regulator circuit has a switching output and is configured to switch between a first voltage and a second voltage. The output circuit has a voltage input and a voltage output. The voltage input is coupled to the switching output. The output circuit is configured to generate an output signal based on the first voltage and the second voltage. The duty cycle comparison circuit is configured to assert a first signal responsive to a voltage provided at the voltage output exceeding a product of a multiplier and a reference signal. The current comparison circuit is configured to assert a second signal responsive to a voltage provided at the voltage input exceeding a first reference voltage and to assert a third signal responsive to the voltage provided at the voltage input being below a second reference voltage. The switching regulator control circuit is configured to control the switching regulator circuit based on the first, the second, and the third signals.

BRIEF DESCRIPTION OF THE DRAWINGS

FIG. 7 is a timing diagram of an example power converter circuit in accordance with various examples.

DETAILED DESCRIPTION

Figure 1:
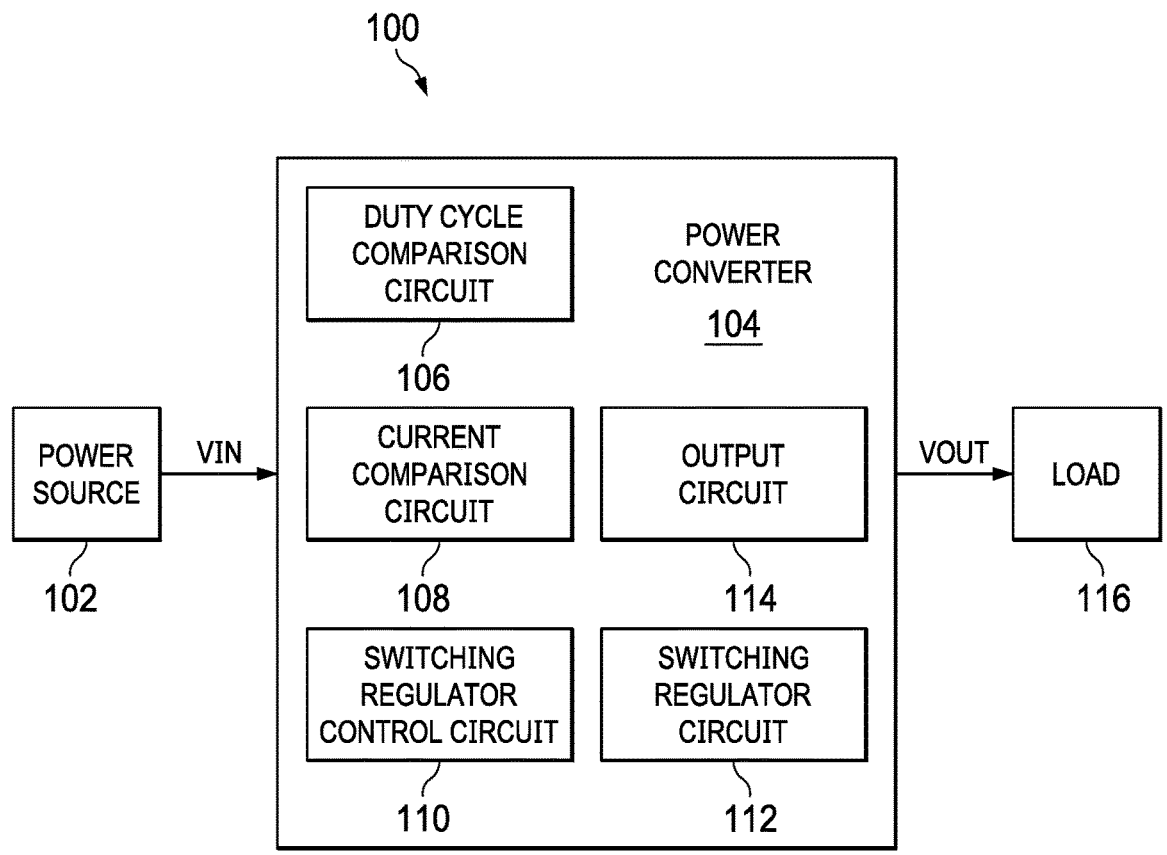
FIG. 1 is a block diagram of a system including an example power converter circuit in accordance with various examples.

As described above, power converter converts an input signal (e.g., supplied by a direct current (DC) source) to an output signal by switching transistors between on and off states. Transistors such as field effect transistors (FETs) are effective switches because after the FETs are turned on or off, they draw little to no additional power. However, at switching moments, a transistor may be susceptible to high ringing voltages, or voltage spikes, because of an output circuit coupled between the transistor and a load. For example, the output circuit may include an inductor that begins to store energy responsive to a first transistor having an on state and a second transistor having an off state.

Responsive to the first and the second transistors switching states, energy stored in the inductor may begin to dissipate in an effort to maintain a current of the output signal, and thus voltage spikes may occur at a switching node at which the transistors and the output circuit couple. The voltage spikes may result in a failure of the transistors or other components of the power converter circuit or may cause corresponding spikes in the current of the output signal. The spikes in current may damage or interfere with operations of a load coupled to the output circuit.

A current comparison circuit is often included in power converter circuits to help prevent the voltage spikes. The current comparison circuit may include a first comparator to compare a voltage associated with a current of an output circuit to a first reference voltage associated with a first current limit level responsive to a first transistor having an on state and a second transistor having an off state. A voltage associated with the current of the output circuit may be measured at the node at which the transistors and the output circuit couple and may be referred to as a sensed voltage. Responsive to an increase in the current of the output circuit, the sensed voltage decreases. To determine whether the current of the output circuit is above the first current limit level, the current comparison circuit described above determines whether the sensed voltage is less than the first reference voltage. The current comparison circuit may also include a second comparator to compare the sensed voltage to a second reference voltage associated with a second current limit level responsive to the first transistor having an off state and the second transistor having an on state. Responsive to a decrease in the current of the output circuit, the sensed voltage increases. To determine whether the current of the output circuit is below the second current limit level, the current comparison circuit described above determines whether the sensed voltage is greater than the second reference voltage. The first current limit level may be set to a value that is slightly higher than a current needed to supply a load adapted to be coupled to the power converter circuit. The second current limit level may be set to a value slightly less than a current that is chosen according to any suitable criteria for a particular system or device.

The current comparison circuit described above allows for current limiting responsive to the sensed voltage having a value that is less than the first reference voltage associated with the first current limit level or a value that is greater than the second reference voltage associated with the second current limit level. However, such current comparison circuits are not foolproof, particularly in power converters with high frequency reference clock signals or having wide ranging duty cycles. In particular, responsive to a high frequency reference clock signal, the first transistor or the second transistor may switch to an on state before the elapse of a minimum amount of time needed for an accurate measurement of the sensed voltage to be taken. During this minimum amount of time, the current of the output circuit may exceed the first current limit level or fall below the second current limit level. Responsive to the current of the output circuit crossing the current limit levels, voltage spikes may occur at the switching node at which the transistors and the output circuit couple.

Also, the power converter circuit may require a wide range of supply voltages to support a target output voltage range, so a duty cycle of the power converter circuit varies over a wide range. The wide range duty cycle may result in the first transistor or the second transistor switching to an on state before the elapse of the minimum amount of time needed for an accurate measurement to be taken and voltage spikes may have occurred. In instances where the reference clock signal has a high frequency or the power converter circuit has a wide range duty cycle, the current comparison circuit described above may reduce, but does not eliminate, a number of occurrences of voltage spikes. In certain applications, such as sensor processor powering systems (e.g., airbags, anti-lock brakes, power steering, etc.), industry standards include strict tolerances for a number of failures in time that may occur during a time period. Instances of voltage spikes may damage the power converter circuit and cause disruptions to systems powered by the power converter circuit. The disruptions may cause a system to exceed strict failure in time tolerances.

Accordingly, described herein are various examples of power converter circuits that include a current comparison circuit and a duty cycle comparison circuit to overcome the challenges described above. The power converter circuit described herein drives an output signal according to a duty cycle of an input signal while limiting a current of the output circuit such that the current of the output circuit remains between an upper and a lower current limit level. In some examples, the current limit levels may include a first set of current limit levels and a second set of current limit levels. The first set of current limit levels may define an upper current limit range within which the current of the output circuit is to operate, and the second set of current limit levels may define a lower current limit range within which the current of the output circuit is to operate. Each current limit range includes an upper current limit level and a lower current limit level. For example, the upper current limit range may have an upper current limit level of 5 amperes (A) and a lower current limit level of 4 A, and the lower current limit range may have an upper current limit level of −2 A and a lower current limit level of −1 A. The current comparison circuit enables the power converter circuit to force a transistor to switch on responsive to an indication that the current of the output circuit has crossed a current limit level. A transistor being switched on in opposition to a state indicated by a reference clock signal may herein be referred to as "forcing on" the transistor.

The duty cycle comparison circuit enables the power converter circuit to control whether a transistor is forced to switch on responsive to an indication that a duty cycle of the output signal is operating above or below a duty cycle limit. In some examples, the duty cycle comparison circuit may include an upper duty cycle limit and a lower duty cycle limit. For example, given a duty cycle range of 0.1 to 1, an upper duty cycle limit may be 0.75 and a lower duty cycle limit may be 0.25. The duty cycle comparison circuit indicates whether the duty cycle of the output signal is operating in a low duty cycle range, a middle duty (mid-duty) cycle range, or an upper duty cycle range. The power converter circuit controls whether a transistor is forced to switch on responsive to an indication that the duty cycle of the output signal is operating within a certain range.

FIG. 1 is a block diagram of a system 100 having an example power converter circuit 104, in accordance with various examples. In examples, the system 100 is representative of a power supply for a sensor processing system of an automotive system such as an airbag, anti-lock brake, or power steering system. In some examples, the system 100 is representative of a power supply for a sensor processing system of a personal electronic device such as a tablet, notebook, or smartphone. More generally, the system 100 is representative of any system or device including a power converter circuit, and particularly any system or device including a high-frequency, wide duty cycle step-down converter. Accordingly, the system 100 may benefit from limiting a current of an output signal across a wide duty cycle such that the current of the output circuit is between an upper and a lower tolerance to maintain compliance with safety standards applicable to the system 100.

In some examples, the system 100 includes a power source 102, the power converter circuit 104, and a load 116. The power source 102 is coupled to the power converter circuit 104. The power source 102 may be any device capable of supplying either a DC or an alternating current (AC) input signal. For example, the power source 102 may be a generator, a power storage component (e.g., battery), or a rectifier circuit configured to convert an AC signal to a DC signal (e.g., alternator). The power converter circuit 104 is coupled to the power source 102 and to the load 116. In examples, the power converter circuit 104 includes a duty cycle comparison circuit 106, a current comparison circuit 108, a switching regulator control circuit 110, a switching regulator circuit 112, and an output circuit 114. Example details regarding the contents and operations of the duty cycle comparison circuit 106, the current comparison circuit 108, the switching regulator control circuit 110, the switching regulator circuit 112, and the output circuit 114 are provided below with respect to FIGS. 2 and 5. The load 116 is coupled to the power converter circuit 104. The load 116 is any component, circuit, or device adapted to receive and be powered by an output signal from the power converter circuit 104. For example, the load 116 may be, or may be components of, an automobile sensor processing system.

FIG. 1 shows a signal VIN and a signal VOUT. The power source 102 outputs the signal VIN to the power converter circuit 104 for processing by the power converter circuit 104. The power converter circuit 104 processes the signal VIN and outputs the signal VOUT to power the load 116. Details regarding operation of the power converter circuit 104 are provided below, but generally, the duty cycle comparison circuit 106 enables the power converter circuit 104 to control whether a transistor is forced on responsive to an indication that a duty cycle of the signal VOUT is operating above or below a duty cycle limit. The current comparison circuit 108 enables the power converter circuit 104 to force a transistor to switch on responsive to an indication that a current of the output circuit 114 has crossed current limit levels. The switching regulator control circuit 110 drives the switching regulator circuit 112 responsive to indicators from the duty cycle comparison circuit 106 and the current comparison circuit 108. Responsive to an output signal of the switching regulator control circuit 110, the switching regulator circuit 112 switches states of transistors in an alternating manner to generate a voltage that switches between a first voltage and a second voltage. The output circuit 114 regulates and filters the voltage of the switching regulator circuit 112 to generate the signal VOUT having a current that is within the current limit levels. The load 116 operates, at least partially, according to the signal VOUT. In examples where the power converter circuit 104 is a stepdown converter, a voltage of the signal VOUT is less than a voltage of the signal VIN.

Figure 2:
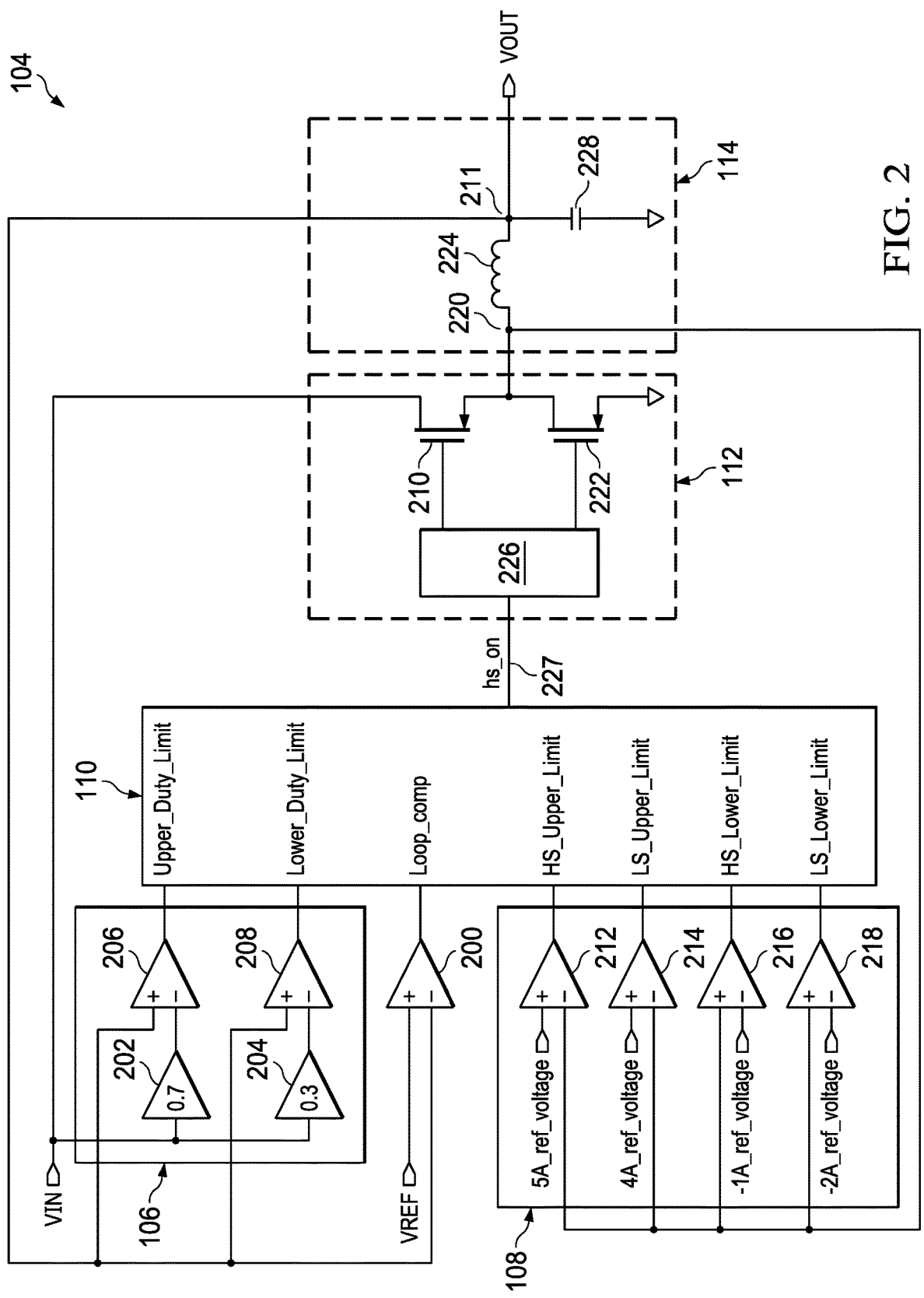
FIG. 2 is a schematic diagram of an example power converter circuit in accordance with various examples.

FIG. 2 is a schematic diagram of the example power converter circuit 104, in accordance with examples. As described above with respect to FIG. 1, the power converter circuit 104 includes the duty cycle comparison circuit 106, the current comparison circuit 108, the switching regulator control circuit 110, the switching regulator circuit 112, and the output circuit 114. Although not expressly shown in FIG. 1, the power converter circuit 104 further includes a comparator 200, which is described below with respect to FIG. 2.

The duty cycle comparison circuit 106 receives a reference signal VIN and is coupled to the switching regulator control circuit 110, to the switching regulator circuit 112, and to the output circuit 114. The reference signal VIN may be supplied by the power source 102 (FIG. 1), for example. In examples, the duty cycle comparison circuit 106 includes amplifier circuits 202 and 204 and comparators 206 and 208. In examples, the amplifier circuits 202, 204 are non-inverting amplifiers having a non-unity gain. In some examples, the amplifier circuits 202, 204 may be replaced by voltage divider circuits. The amplifier circuit 202 receives the reference signal VIN and is coupled to an inverting terminal of the comparator 206 and to a drain terminal of a transistor 210 of the switching regulator circuit 112. A non-inverting terminal of the comparator 206 is coupled to an output node 211 of the output circuit 114. An output terminal of the comparator 206 is coupled to an input Upper_Duty_Limit of the switching regulator control circuit 110. The amplifier circuit 204 receives the reference signal VIN and is coupled to an inverting terminal of the comparator 208. A non-inverting terminal of the comparator 208 is coupled to the output node 211. An output terminal of the comparator 208 is coupled to an input Lower_Duty_Limit of the switching regulator control circuit 110. Because the non-inverting terminals of the comparators 206, 208 couple to the output node 211, the comparators 206, 208 are adapted to receive the signal VOUT.

The current comparison circuit 108 receives multiple reference voltages and is coupled to the switching regulator control circuit 110, to the switching regulator circuit 112, and to the output circuit 114. Each of the reference voltages has a respective current limit level. The different current limit levels are application-specific and may be determined using any suitable criteria for a particular system or device. For example, a first and a second current limit level may determine an upper current limit range for the output signal of the power converter circuit 104 and a third and a fourth current limit level may determine a lower current limit range for the output signal of the power converter circuit 104. The reference voltages may be supplied by any component, circuit, or device configured to supply a voltage.

In examples, the current comparison circuit 108 includes comparators 212, 214, 216, and 218. A non-inverting terminal of the comparator 212 receives a reference voltage 5 A_ref_voltage. The reference voltage 5 A_ref_voltage may be associated with a current limit level of 5 A, for example. An inverting terminal of the comparator 212 is coupled to a switching node 220, to a source of the transistor 210, to a drain of a transistor 222, and to a first end of an inductor 224. An output terminal of the comparator 212 is coupled to an input HS_Upper_Limit of the switching regulator control circuit 110. A non-inverting terminal of the comparator 214 receives a reference voltage 4 A_ref_voltage. The reference voltage 4 A_ref_voltage may be associated with a current limit level of 4 A, for example. An inverting terminal of the comparator 214 is coupled to the switching node 220. An output terminal of the comparator 214 is coupled to an input LS_Upper_Limit of the switching regulator control circuit 110. An inverting terminal of the comparator 216 receives a reference voltage −1 A_ref_voltage. The reference voltage −1 A_ref_voltage may be associated with a current limit level of −1 A, for example. A non-inverting terminal of the comparator 216 is coupled to the switching node 220. An output terminal of the comparator 216 is coupled to an input HS_Lower_Limit of the switching regulator control circuit 110. An inverting terminal of the comparator 218 receives a reference voltage −2 A_ref_voltage. The reference voltage −2 A_ref_voltage may be associated with a current limit level of −2 A, for example. A non-inverting terminal of the comparator 218 is coupled to the switching node 220. An output terminal of the comparator 218 is coupled to an input LS_Lower_Limit of the switching regulator control circuit 110.

The switching regulator control circuit 110 is coupled to the duty cycle comparison circuit 106, to the current comparison circuit 108, and to the switching regulator circuit 112. The switching regulator control circuit 110 also includes an input Loop_comp that is coupled to an output of the comparator 200. Example details regarding the contents of the switching regulator control circuit 110 are described below with respect to FIGS. 5A and 5B. In examples, the switching regulator control circuit 110 includes multiple inputs and an output coupled to a driver circuit 226 of the switching regulator circuit 112. An output signal hs_on is provided at the output 227 of the switching regulator control circuit 110.

The switching regulator circuit 112 receives the reference signal VIN and is coupled to the switching regulator control circuit 110, to the output circuit 114, to the duty cycle comparison circuit 106, and to the current comparison circuit 108. In examples, the switching regulator circuit 112 includes the driver circuit 226, the transistor 210, and the transistor 222. In some examples, the transistors 210, 222 are field-effect transistors (FETs). In examples, the transistors 210, 222 are n-channel FETs (NFETs). In some examples, the transistors 210, 222 are high voltage FETs. The driver circuit 226 is coupled to the output 227 of the switching regulator control circuit 110, to a gate terminal of the transistor 210, and to a gate terminal of the transistor 222. The driver circuit 226 may be any circuit configured to switch the transistors 210, 222 in an alternating fashion such that at a time that the transistor 210 is on, the transistor 222 is off and such that at a time that the transistor 210 is off, the transistor 222 is on. A drain terminal of the transistor 210 receives the reference signal VIN and is coupled to the amplifiers 202, 204. Because the transistor 210 receives the reference signal VIN, the transistor 210 may be referred to as a high-side (HS) transistor 210. As described above, the source terminal of the transistor 210 is coupled to the drain terminal of the transistor 222, to the switching node 220, to the first end of the inductor 224, to the inverting terminals of the comparators 212, 214, and to the non-inverting terminals of the comparators 216, 218. A source terminal of the transistor 222 is coupled to a ground terminal. Because the transistor 222 is coupled to the ground terminal, the transistor 222 may be referred to as a low-side (LS) transistor 222.

The output circuit 114 is adapted to be coupled to a load (not expressly shown in FIG. 2) and is coupled to the duty cycle comparison circuit 106, to the current comparison circuit 108, and to the switching regulator circuit 112. The load may be the load 116, for example. In examples, the output circuit 114 includes the switching node 220, the inductor 224, the output node 211, and a capacitor 228. As described above, the first end of the inductor 224 is coupled to the switching node 220, to the inverting terminals of the comparators 212, 214, to the non-inverting terminals of the comparators 216, 218, to the source terminal of the transistor 210, and to the drain terminal of the transistor 222. A second end of the inductor 224 is adapted to be coupled to a load 116 and is coupled to a first end of the capacitor 228, to the output node 211, and to the non-inverting terminals of the comparators 206, 208. A second end of the capacitor 228 is coupled to the ground terminal. The signal VOUT is provided at the output node 211.

The comparator 200 receives a reference voltage VREF (e.g., at a non-inverting terminal of the comparator 200) and is coupled to the switching regulator control circuit 110 and to the output circuit 114. The reference voltage VREF may be supplied by a reference voltage source, for example. The reference voltage may be referred to as a feedback voltage threshold VREF, or simply VREF. The reference voltage source may be any component, circuit, or device configured to supply a voltage. In examples, the inverting terminal of the comparator 200 is coupled to the output node 211 and the output terminal of the comparator 200 is coupled to an input Loop_comp of the switching regulator control circuit 110.

Figure 3:
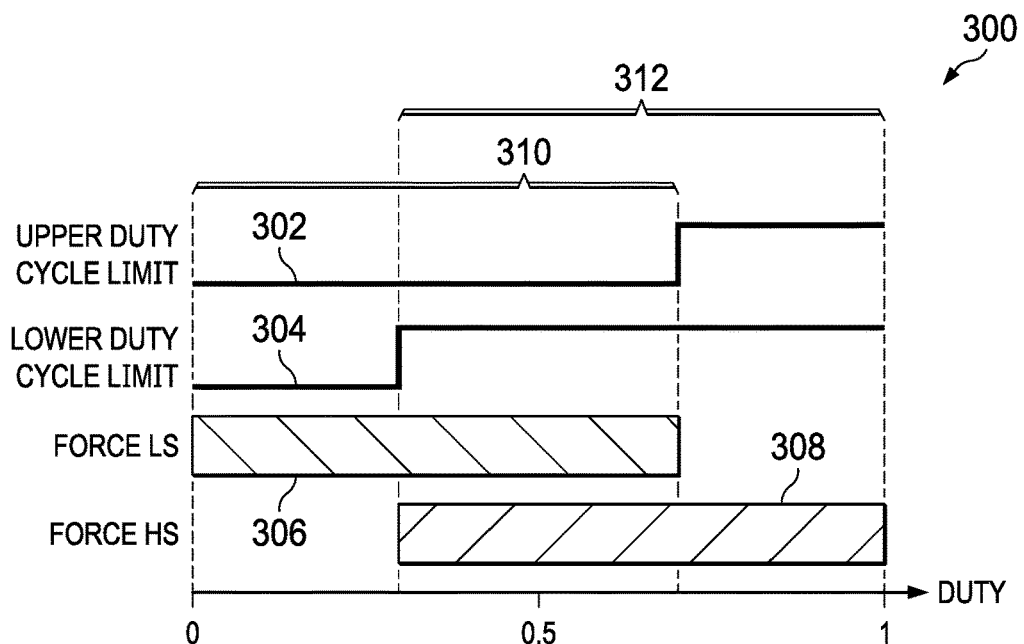
FIG. 3 is a diagram of an operation of an example duty cycle comparison circuit of a power converter circuit in accordance with various examples.

The operation of the duty cycle comparison circuit 106 is now described. The reference signal VIN is provided to the duty cycle comparison circuit 106. In examples, a voltage of the reference signal VIN may vary between 2.7 volts (V) and 5.5V. In some examples, the voltage of the reference signal VIN is application-specific and may vary between an upper limit and a lower limit according to any suitable criteria for a particular system or device. The amplifier circuit 202 outputs a voltage that is a product of the voltage of the reference signal VIN and a gain of the amplifier circuit 202. The gain of the amplifier circuit 202 may be a multiplier that corresponds to an upper duty cycle limit. The upper duty cycle limit may indicate that only the HS transistor 210 may be forced to switch on or to remain on. For example, responsive to an upper duty cycle limit of 0.7, the amplifier circuit 202 may have a 0.7 gain. The comparator 206 compares the output of the amplifier circuit 202 to the voltage of the signal VOUT. In examples, the voltage of the signal VOUT may vary between 0.3V and 3.3V. In some examples, the voltage of the signal VOUT is application-specific and may vary between an upper limit and a lower limit according to any suitable criteria for a particular system or device. Based on the comparison, the comparator 206 generates an output signal that indicates whether the voltage of the signal VOUT is greater than or less than the output of the amplifier circuit 202. (FIG. 3 is a diagram showing forcing permissions based on duty cycle limits and is described below.) The output signal of the comparator 206 is provided to the input Upper_Duty_Limit of the switching regulator control circuit 110. Operation of the switching regulator control circuit 110 is described below with respect to FIGS. 5A and 5B.

The amplifier circuit 204 outputs a voltage that is a product of the reference signal VIN and a gain of the amplifier circuit 204. The gain of the amplifier circuit 204 may be a multiplier that corresponds to a lower duty cycle limit that may indicate that only the LS transistor 222 may be forced to switch on or to remain on. For example, responsive to a lower duty cycle limit of 0.3, the amplifier circuit 204 may have a 0.3 gain. In some examples, the gains of the amplifier circuits 202, 204 are application-specific and thus are chosen according to any suitable criteria for a particular system or device. The comparator 208 compares the output of the amplifier circuit 204 to the voltage of the signal VOUT. Based on the comparison, the comparator 206 generates an output signal that indicates whether the voltage of the signal VOUT is greater than or less than the output of the amplifier circuit 204. (As described above, FIG. 3 is a diagram showing forcing permissions based on duty cycle limits.) The output signal of the comparator 208 is provided to the input Lower_Duty_Limit of the switching regulator control circuit 110. As described above, operation of the switching regulator control circuit 110 is described below with respect to FIGS. 5A and 5B.

The operation of the current comparison circuit 108 is now described. The reference voltage 5 A_ref_voltage is supplied to the non-inverting terminal of the comparator 212. The reference voltage 5 A_ref_voltage may be associated with a target inductor current of 5 A, for example. The inductor current is a current of the inductor 224 and may be referred to as the current of the output circuit 114. In some examples, the reference voltage 5 A_ref_voltage is associated with a current limit level that corresponds to a current that is slightly greater than a current level needed to operate a system or device. For example, the reference voltage 5 A_ref_voltage may be associated with a current limit level that is 0.2 A greater than a current needed to operate a system or device. In some examples, the reference voltage 5 A_ref_voltage is application-specific and thus is chosen according to any suitable criteria for a particular system or device. The comparator 212 compares the reference voltage 5 A_ref_voltage to the sensed voltage provided at the switching node 220. As described above, the sensed voltage is associated with a current of the output circuit 114. Because the current of the output circuit 114 is measured at the switching node 220 to which the transistors 210, 222 couple to the output circuit 114, the current of the output circuit 114 may be referred to as an input current of the output circuit 114. Based on the comparison, the comparator 212 generates an output signal that indicates whether the reference voltage 5 A_ref_voltage is greater than or less than the sensed voltage. The output signal of the comparator 212 is provided to the input HS_Upper_Limit of the switching regulator control circuit 110. As described above, operation of the switching regulator control circuit 110 is described below with respect to FIGS. 5A and 5B.

The reference voltage 4 A_ref_voltage is supplied to the non-inverting terminal of the comparator 214. The reference voltage 4 A_ref_voltage may be associated with a target inductor current of 4 A, for example. In some examples, the reference voltage 4 A_ref_voltage is associated with a current limit level that is slightly lower than a current needed to prevent the sensed voltage from exceeding the reference voltage 5 A_ref_voltage responsive to either the HS transistor 210 or the LS transistor 222 switching on. For example, the reference voltage 4 A_ref_voltage may be associated with a current limit level that is 0.2 A lower than a current needed to prevent the sensed voltage from exceeding the reference voltage 5 A_ref_voltage responsive to either the HS transistor 210 or the LS transistor 222 switching on. In some examples, the reference voltage 4 A_ref_voltage is application-specific and is chosen according to any suitable criteria for a particular system or device. In examples, the reference voltage 5 A_ref_voltage and the reference voltage 4 A_ref_voltage are an upper and a lower current limit level of an upper current limit range within which the inductor current is to operate. The comparator 214 compares the reference voltage 4 A_ref_voltage to the sensed voltage. Based on the comparison, the comparator 214 generates an output signal that indicates whether the reference voltage 4 A_ref_voltage is greater than or less than the sensed voltage. The output signal of the comparator 214 is provided to the input LS_Upper_Limit of the switching regulator control circuit 110. As described above, operation of the switching regulator control circuit 110 is described below with respect to FIGS. 5A and 5B.

The reference voltage −1 A_ref_voltage is supplied to the inverting terminal of the comparator 216. The reference voltage −1 A_ref_voltage may be associated with a target inductor current of −1 A, for example. In some examples, the reference voltage −1 A_ref_voltage is associated with a current limit level that is slightly higher than a current needed to prevent the sensed voltage from having a value that is less than the reference voltage −2 A_ref_voltage responsive to either the HS transistor 210 or the LS transistor 222 switching on. For example, the reference voltage −1 A_ref_voltage may be associated with a current limit level that is 0.2 A higher than a current needed to prevent the sensed voltage from exceeding the reference voltage −2 A_ref_voltage responsive to either the HS transistor 210 or the LS transistor 222 switching on. In some examples, the reference voltage −1 A_ref_voltage is application-specific and is chosen according to any suitable criteria for a particular system or device. The comparator 216 compares the reference voltage −1 A_ref_voltage to the sensed voltage. Based on the comparison, the comparator 216 generates an output signal that indicates whether the reference voltage −1 A_ref_voltage is greater than or less than the sensed voltage. The output signal of the comparator 216 is provided to the input HS_Lower_Limit of the switching regulator control circuit 110. As described above, operation of the switching regulator control circuit 110 is described below with respect to FIGS. 5A and 5B.

The reference voltage −2 A_ref_voltage is supplied to the inverting terminal of the comparator 218. The reference voltage −2 A_ref_voltage may be associated with a target inductor current of −2 A, for example. In some examples, the reference voltage −2 A_ref_voltage is associated with a current limit level that is a current slightly lower than a minimum current needed for the system or device to operate. For example, the reference voltage −2 A_ref_voltage may be associated with a current limit level that is 0.2 A lower than a minimum current needed for the system or device to operate. In some examples, the reference voltage −2 A_ref_voltage is chosen according to any suitable criteria for a particular system or device. In examples, the reference voltage −1 A_ref_voltage and the reference voltage −2 A_ref_voltage are an upper and a lower current limit level of a lower current limit range within which the inductor current is to operate. The comparator 218 compares the reference voltage −2 A_ref_voltage to the sensed voltage. Based on the comparison, the comparator 218 generates an output signal that indicates whether the reference voltage −2 A_ref_voltage is greater than or less than the sensed voltage. The output signal of the comparator 218 is provided to the input LS_Lower_Limit of the switching regulator control circuit 110. As described above, operation of the switching regulator control circuit 110 is described below with respect to FIGS. 5A and 5B.

The operations of the switching regulator circuit 112 and the output circuit 114 are now described. The driver circuit 226 receives the output signal hs_on of the switching regulator control circuit 110 as an input. (As stated above, the operation of the switching regulator control circuit 110 is described below with respect to FIG. 5.) Responsive to the output signal hs_on indicating the HS transistor 210 is to be enabled, the driver circuit 226 drives the gate terminal of the HS transistor 210 high and drives the gate terminal of the LS transistor 222 low. Responsive to the gate terminal of the transistor 210 being high, the HS transistor 210 allows current to propagate from the drain terminal of the HS transistor 210 to the source terminal of the HS transistor 210, and the HS transistor 210 is described as on. Responsive to the gate terminal of the transistor 222 being low, the LS transistor 222 prevents a current from propagating from the drain terminal of the LS transistor 222 to the source terminal of the LS transistor 222, and the LS transistor 222 is described as off. Responsive to the HS transistor 210 being on and the LS transistor 222 being off, a current propagates through the HS transistor 210 to the switching node 220 and through the inductor 224. As current propagates through the inductor 224 and the capacitor 228, energy is stored in the inductor 224, the capacitor 228 begins to build a charge, and the signal VOUT is provided at the output node 211. The input current of the output circuit 114 is provided at the switching node 220 and a corresponding sensed voltage may be measured at the switching node 220.

Responsive to the output signal hs_on indicating the HS transistor 210 is to be disabled, the driver circuit 226 drives the gate terminal of the HS transistor 210 low and drives the gate terminal of the LS transistor 222 high. Responsive to the gate terminal of the transistor 210 being low, no current propagates through the HS transistor 210. Responsive to the gate terminal of the transistor 222 being high, current is allowed to propagate through the LS transistor 222. Responsive to the LS transistor 222 switching on, the stored energy of the inductor 224 begins to dissipate and the inductor current decreases. The decreasing inductor current is provided at the switching node 220 and a corresponding sensed voltage may be measured at the switching node 220.

The operation of the comparator 200 is now described. As described above, the voltage VREF is supplied to the non-inverting terminal of the comparator 200. The comparator 200 compares the voltage VREF to the voltage of the signal VOUT. The voltage of the signal VOUT may herein be referred to as a feedback voltage. Based on the comparison, the comparator 200 generates an output signal that indicates whether the voltage of the signal VOUT is greater than or less than the voltage VREF. The output signal of the comparator 200 is provided to the input Loop_comp of the switching regulator control circuit 110. As described above, operation of the switching regulator control circuit 110 is described below with respect to FIG. 5.

Referring now to FIG. 3, a diagram 300 of the operation of a duty cycle comparison circuit of a power converter circuit is shown in accordance with examples. The duty cycle comparison circuit may be the duty cycle comparison circuit 106, for example. The power converter circuit may be the power converter circuit 104, for example. An x-axis of the diagram 300 shows a duty cycle as a multiplier of a duty cycle range. The y-axis of the diagram 300 shows an operational diagram 302 of an UPPER DUTY CYCLE LIMIT comparator that determines whether the voltage of the signal VOUT is greater than an upper duty cycle limit and an operational diagram 304 of a LOWER DUTY CYCLE LIMIT comparator that determines whether the voltage of the signal VOUT is greater than a lower duty cycle limit. The UPPER DUTY CYCLE LIMIT comparator may be the comparator 206 and the LOWER DUTY CYCLE LIMIT comparator may be the comparator 208, for example. The y-axis of the diagram shows a FORCE LS diagram 306 illustrating the portions of the duty cycle range during which an LS transistor may be forced to switch on or to remain on and a FORCE HS diagram 308 illustrating the portions of the duty cycle range during which a HS transistor may be forced to switch on or to remain on. The LS transistor may be the transistor 222 and the HS transistor may be the transistor 210, for example.

Still referring to FIG. 3, boundaries of windows 310 and 312 divide the duty cycle range into three sections. A first section spanning the duty cycle range from 0 to a lower boundary of the window 312 may be referred to as a low duty cycle range. The lower boundary of the window 312 may correspond to a lower duty cycle limit of 0.3, for example. A second section spanning the duty cycle range from the lower boundary of the window 312 to an upper boundary of the window 310 may be referred to as a middle duty (mid-duty) cycle range. The upper boundary of the window 310 may correspond to an upper duty cycle limit of 0.7, for example. A third section spanning the duty cycle range from the upper boundary of the window 310 to 1 may be referred to as a high duty cycle range. During the window 310, the LS transistor 222 may be forced to switch on or remain on, as indicated by the FORCE LS diagram 306. During the window 312, the HS transistor 210 may be forced to switch on or remain on, as indicated by the FORCE HS diagram 308.

For the low duty cycle range, the power converter circuit 104 may force the LS transistor 222 to switch on or to remain on but may not force the HS transistor 210 to switch on. A low signal of the operational diagram 302 indicates that the LS transistor 222 may be forced to switch on or to remain on. A low signal of the operational diagram 304 indicates that the HS transistor 210 may not be forced to switch on or to remain on. Forcing the LS transistor 222 on during the low duty cycle does not limit the duty cycle and draws the current of the output circuit 114 to a level that prevents a sensed voltage from crossing a reference voltage associated with an upper current limit responsive to the HS transistor 210 switching to an on state in accordance with the duty cycle of a reference signal. For a middle duty (e.g., mid-duty) cycle range, the power converter circuit 104 may force either the LS transistor 222 or the HS transistor 210 to switch on or to remain on without limiting the duty cycle. A high signal of the operational diagram 304 indicates that the HS transistor 210 may be forced to switch on or to remain on. For a high duty cycle range, the power converter circuit 104 may force the HS transistor 210 to switch on or remain on but may not force the LS transistor 222 to remain on or switch on. A high signal of the operational diagram 304 indicates that the LS transistor 222 may not be forced to switch on or to remain on. Forcing the HS transistor 210 on during the high duty cycle range does not limit the duty cycle and draws the current of the output circuit 114 to a level that prevents the sensed voltage from crossing a reference voltage associated with a lower current limit responsive to the LS transistor 222 switching on in accordance with the duty cycle of a reference signal.

Figure 4A:
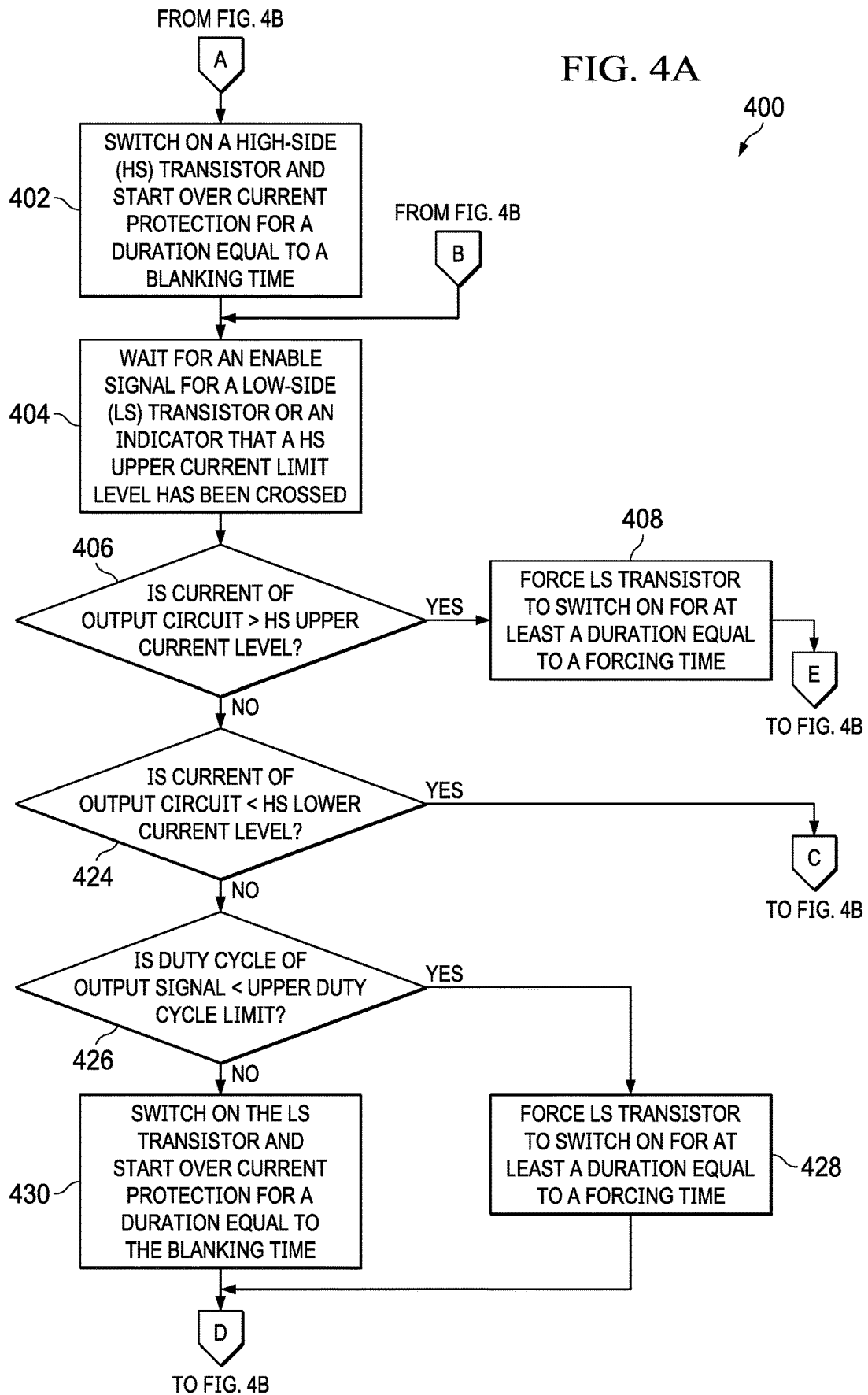
FIGS. 4A and 4B are a flowchart of an example method for operating a power converter circuit in accordance with various examples.
Figure 4B:
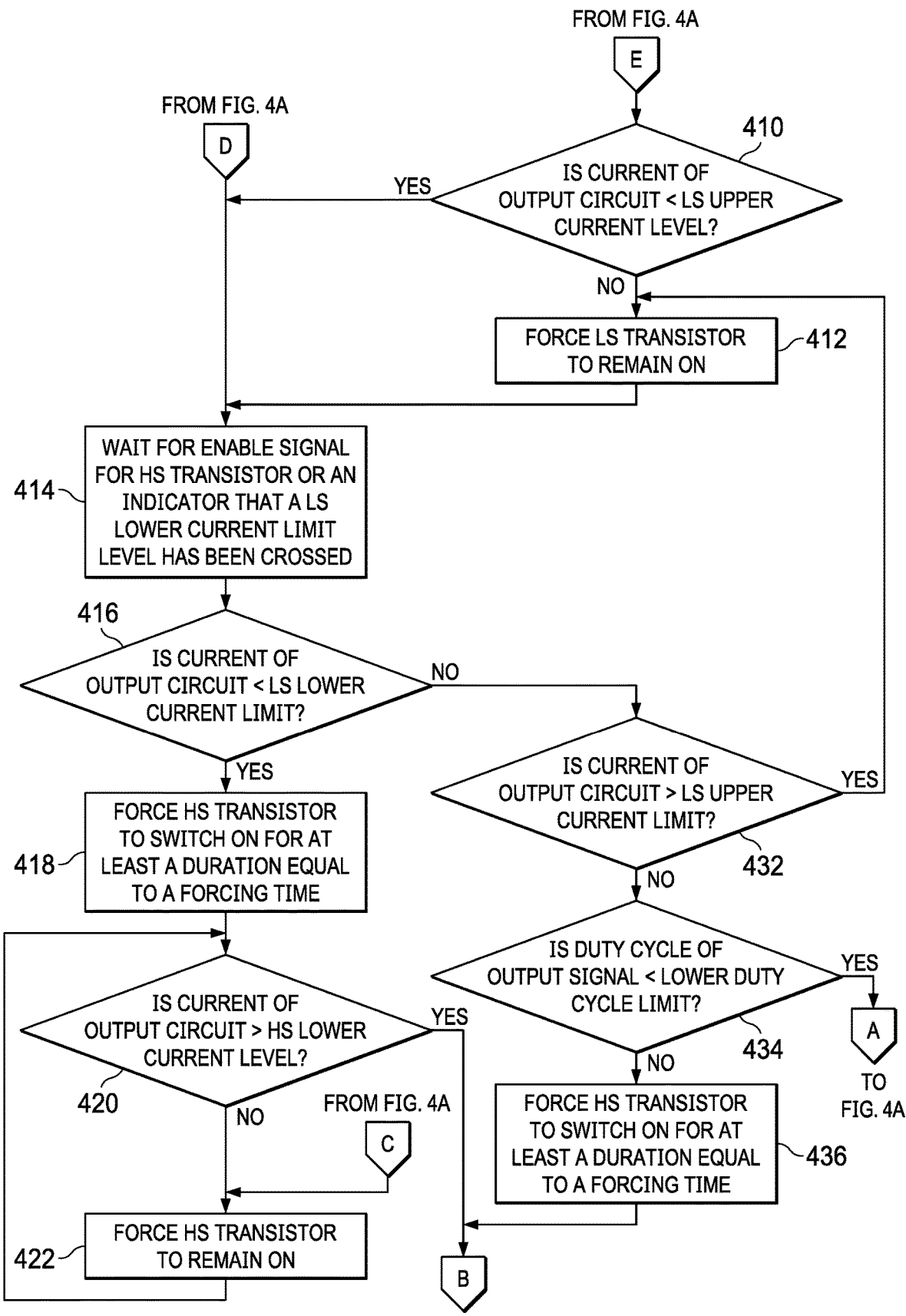

FIGS. 4A and 4B show a flowchart of an example method 400 for operating a power converter circuit, in accordance with various examples. The power converter circuit may be the power converter circuit 104, for example. At block 402 of FIG. 4A, the method 400 starts responsive to the power converter circuit 104 switching on the HS transistor 210 and starting an over current protection for a duration equal to a blanking time. The blanking time is a threshold (e.g., minimum) amount of time needed for an accurate measurement to be taken. In examples, the blanking time may be 28 nanoseconds (ns). In some examples, the blanking time is application-specific and is chosen according to any suitable criteria for a particular system or device. During over current protection, the switching regulator control circuit 110 may ignore the output of the current comparison circuit 108. Ignoring the output of the current comparison circuit 108 prevents inaccurate measurements from affecting the operation of the power converter circuit 104. The power converter circuit 104 may switch on the HS transistor 210 responsive to the comparator 214 indicating that a current of the output circuit 114 has a value that is less than a lower current limit level (e.g., the sensed voltage at the switching node 220 is greater than the reference voltage 4 A_ref_voltage), for example. In another example, the power converter circuit 104 may switch the HS transistor 210 on responsive to the comparator 200 indicating the voltage of the signal VOUT has a value that is less than the voltage VREF.

At block 404 of FIG. 4A, the power converter circuit 104 waits until an enable signal for the LS transistor 222 is received or until an indicator that a HS upper current limit level has been crossed is received. The HS upper current limit level may be an upper current limit level associated with an upper current limit range, for example. For example, the enable signal for the LS transistor may be provided responsive to the comparator 200 indicating that the voltage of the signal VOUT has a value that is greater than the voltage VREF. At block 406 of FIG. 4A, the power converter circuit 104 determines whether a current of the output circuit 114 has a value that is greater than the HS upper current limit level. At block 408 of FIG. 4A, responsive to a determination that the current of the output circuit 114 has a value that is greater than the HS upper current limit level (e.g., the comparator 212 indicating that the sensed voltage at the switching node 220 is less than the reference voltage 5 A_ref_voltage), the power converter circuit 104 forces the LS transistor 222 to switch on for at least a duration equal to a forcing time. The forcing time is a duration of time that includes the blanking time as well as delay times to account for signals propagating through the circuitry.

At block 410 of FIG. 4B, responsive to the duration elapsing, the power converter circuit 104 determines whether the current of the output circuit 114 has a value that is less than an LS upper current limit level. The LS upper current limit level may be a lower current limit level associated with the upper current limit range, for example. Responsive to a determination that the current of the output circuit 114 does not have a value less than the LS upper current limit level (e.g., the comparator 214 indicating that the sensed voltage at the switching node 220 is less than the reference voltage 4 A_ref_voltage), the power converter circuit 104 forces the LS transistor 222 to remain on at block 412 of FIG. 4B. At block 414 of FIG. 4B, the power converter circuit 104 forces the LS transistor 222 to remain on until an enable signal for the HS transistor 210 is received or until an indicator that a LS lower current limit level has been crossed is received. The LS lower current limit level may be a lower current limit level associated with a lower current limit range, for example. A duty cycle of the reference signal VIN may provide the enable signal for the HS transistor 210, for example.

At block 416 of FIG. 4B, the power converter circuit 104 determines whether the current of the output circuit 114 has a value that is less than the LS lower current limit level. Responsive to a determination that the current of the output circuit 114 has a value that is less than the LS lower current limit level (e.g., the comparator 218 indicating that the sensed voltage at the switching node 220 is greater than the reference voltage −2 A_ref_voltage), the power converter circuit 104 forces the HS transistor 210 to switch on for at least a duration equal to the forcing time at block 418 of FIG. 4B. At block 420 of FIG. 4B, after the duration has elapsed, the power converter circuit 104 determines whether the current of the output circuit 114 has a value that is greater than a HS lower current limit level. The HS lower current limit level may be an upper current limit level associated with the lower current limit range, for example. Responsive to a determination that the current of the output circuit 114 has a value that is less than the HS lower current limit level (e.g., the comparator 216 indicating that the sensed voltage at the switching node 220 is greater than the reference voltage −1 A_ref_voltage), the power converter circuit 104 forces the HS transistor 210 to remain on at block 422 of FIG. 4B. The power converter circuit 104 forces the HS transistor 210 to remain on until a determination at block 420 of FIG. 4B indicates the current of the output circuit 114 has a value that is greater than the HS lower current limit level. Responsive to a determination that the current of the output circuit 114 has a value that is greater than the HS lower current limit level (e.g., the comparator 216 indicating that the sensed voltage at the switching node 220 is less than the reference voltage −1 A_ref_voltage), the power converter circuit 104 returns to block 404 of FIG. 4A to wait for an enable signal for the LS transistor 222 or an indicator that the HS upper current limit level has been crossed, as described above.

Referring again to block 406 of FIG. 4A, responsive to a determination that the current of the output circuit 114 is not greater than the HS upper current limit level, the power converter circuit 104 determines whether the current of the output circuit 114 has a value that is less than the HS lower current limit level at block 424 of FIG. 4A. The power converter circuit 104 forces the HS transistor 210 to remain on at block 422 of FIG. 4B responsive to a determination that the current of the output circuit 114 has a value that is less than the HS lower current limit level. The power converter circuit 104 forces the HS transistor 210 to remain on until a determination that the current of the output circuit 114 has a value that is greater than the HS lower current limit level is made at block 420 of FIG. 4B. Responsive to the determination that the current of the output circuit 114 has a value that is greater than the HS lower current limit level (e.g., the comparator 216 indicating that the sensed voltage at the switching node 220 is less than the reference voltage −2 A_ref_voltage), the power converter circuit 104 returns to block 404 of FIG. 4A to wait for an enable signal for the LS transistor 222 or an indicator that a HS upper current limit level has been crossed.

Referring again to block 424 of FIG. 4A, responsive to the power converter circuit 104 determining the current of the output circuit 114 does not have a value that is less than the HS lower current limit level, the power converter circuit 104 determines whether a duty cycle of the signal VOUT is below an upper duty cycle limit at the block 426 of FIG. 4A. At block 432, responsive to a determination that the duty cycle of the signal VOUT has a value that is less than the upper duty cycle limit (e.g., the comparator 206 indicating that 0.7 multiplied by the voltage VIN is greater than the voltage of VOUT), the power converter circuit 104 forces the LS transistor 222 to switch on for at least a duration equal to the forcing time at block 428 of FIG. 4A. The power converter circuit 104 waits for an enable signal for the HS transistor 210 or for an indicator that the LS lower current limit level has been crossed at block 414 of FIG. 4B, as described above.

Referring again to block 426 of FIG. 4A, responsive to a determination that the duty cycle of the signal VOUT does not have a value that is less than the upper duty cycle limit (e.g., the comparator 206 indicating that 0.7 multiplied by the voltage of VIN is less than the voltage of VOUT), the power converter circuit 104 switches on the LS transistor 222 and starts over current protection for a duration equal to the blanking time at block 430 of FIG. 4A. The power converter circuit 104 waits for an enable signal for the HS transistor 210 or for an indicator that the LS lower current limit level has been crossed at block 414 of FIG. 4B, as described above.

Referring again to block 416 of FIG. 4B, responsive to the power converter circuit 104 determining the current of the output circuit 114 has a value that is not less than the LS lower current limit level, the power converter circuit 104 determines, at block 432 of FIG. 4B, whether the current of the output circuit 114 has a value that is greater than the LS upper current limit level. Responsive to a determination that the current of the output circuit 114 has a value that is greater than the LS upper current limit level, the power converter circuit 104 forces the LS transistor 222 to remain on at block 412 of FIG. 4B, as described above.

Referring again to block 432 of FIG. 4B, responsive to a determination that the current of the output circuit 114 has a value that is not greater than the LS upper current limit level, the power converter circuit 104 determines whether the duty cycle of the signal VOUT has a value that is less than a lower duty cycle limit at block 434 of FIG. 4B. The power converter circuit 104 forces the HS transistor 210 to switch on for at least a duration equal to the forcing time at block 436 of FIG. 4B responsive to a determination that the duty cycle of the signal VOUT does not have a value that is below the lower duty cycle limit (e.g., the comparator 208 indicating that 0.3 multiplied by the voltage of VIN is less than the voltage of VOUT). The power converter circuit 104 returns to block 404 of FIG. 4A to wait for the enable signal for the LS transistor 222 or for an indicator that current level has been crossed, as described above.

Referring again to block 434 of FIG. 4B, responsive to a determination that the duty cycle of the output signal has a value that is less than the lower duty cycle limit (e.g., the comparator 208 indicating that 0.3 multiplied by the voltage of VIN is greater than the voltage of VOUT), the power converter circuit 104 returns to block 402 of FIG. 4A to switch on the HS transistor 210 and start over current protection for a duration equal to the blanking time, as described above.

In operation, the method 400 implements the diagram 300 and determines whether conditions for switching the HS transistor 210 and the LS transistor 222 exist. At block 434 of FIG. 4B, the power converter circuit 104 determines whether the duty cycle of the signal VOUT is lower than the lower duty cycle limit. Responsive to the duty cycle of the signal VOUT having a value that is not less than the lower duty cycle limit, the HS transistor 210 may be forced on at block 436 of FIG. 4B. Allowing forcing of the HS transistor 210 responsive to the duty cycle of the signal VOUT having a value that is not less than the lower duty cycle limit matches the FORCE HS diagram 308 for forcing the HS transistor 210 to switch on or to remain on responsive to the duty cycle of the signal VOUT having a value that is not less than the lower duty cycle limit. At block 426 of FIG. 4A, the power converter circuit 104 determines whether the duty cycle of the signal VOUT has a value that is less than the upper duty cycle limit. Responsive to the duty cycle of the signal VOUT having a value that is less than the upper duty cycle limit, the LS transistor 222 may be forced on at block 428 of FIG. 4A. Allowing forcing of the LS transistor 222 responsive to the duty cycle of the signal VOUT having a value that is less than the upper duty cycle limit matches the FORCE LS diagram 306 for forcing the LS transistor 222 to switch on or to remain on responsive to the duty cycle of the signal VOUT having a value that is less than the upper duty cycle limit.

Figure 5A:
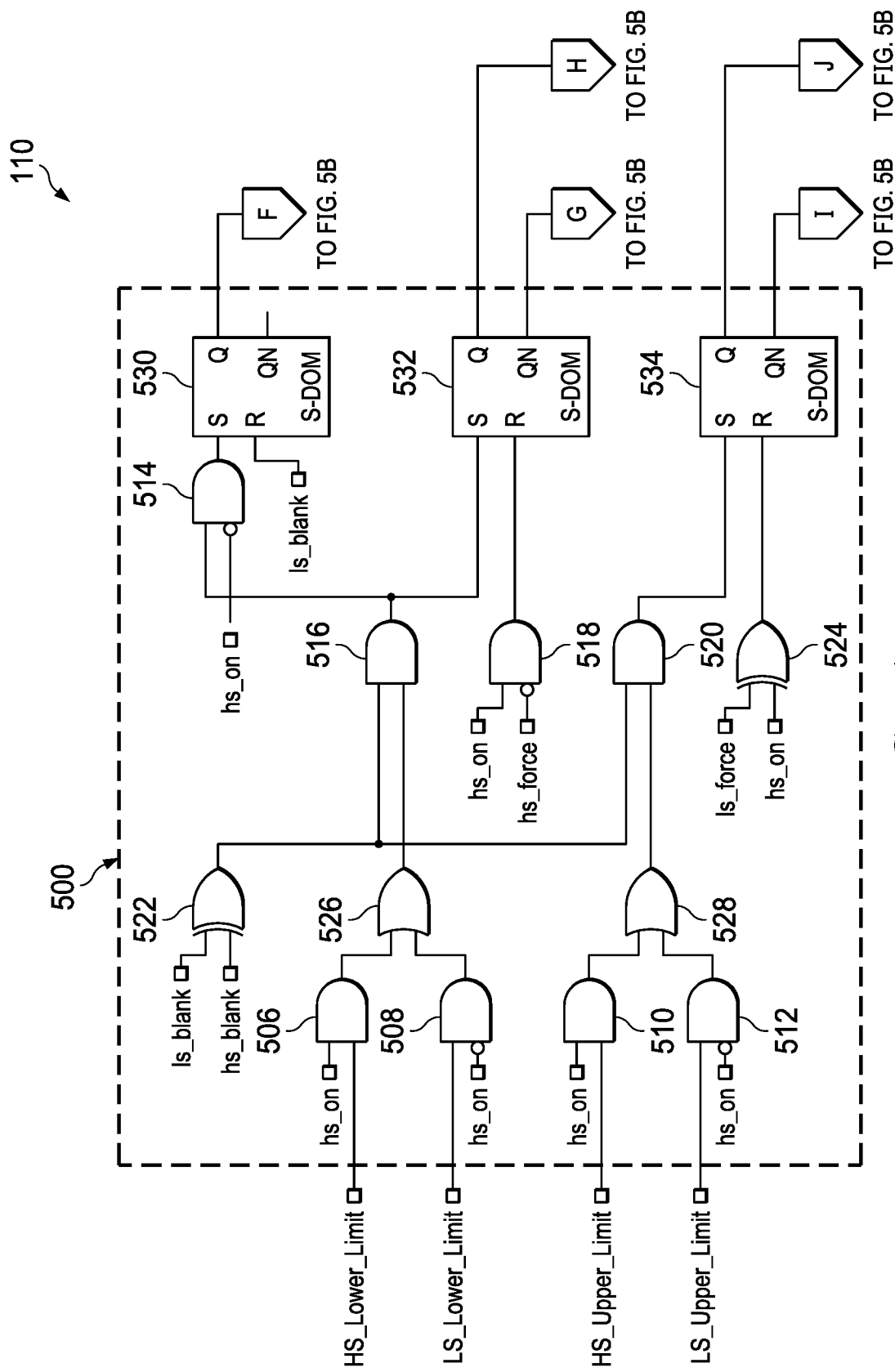
FIGS. 5A and 5B are a schematic diagram of an example switching regulator control circuit in accordance with various examples.
Figure 5B:
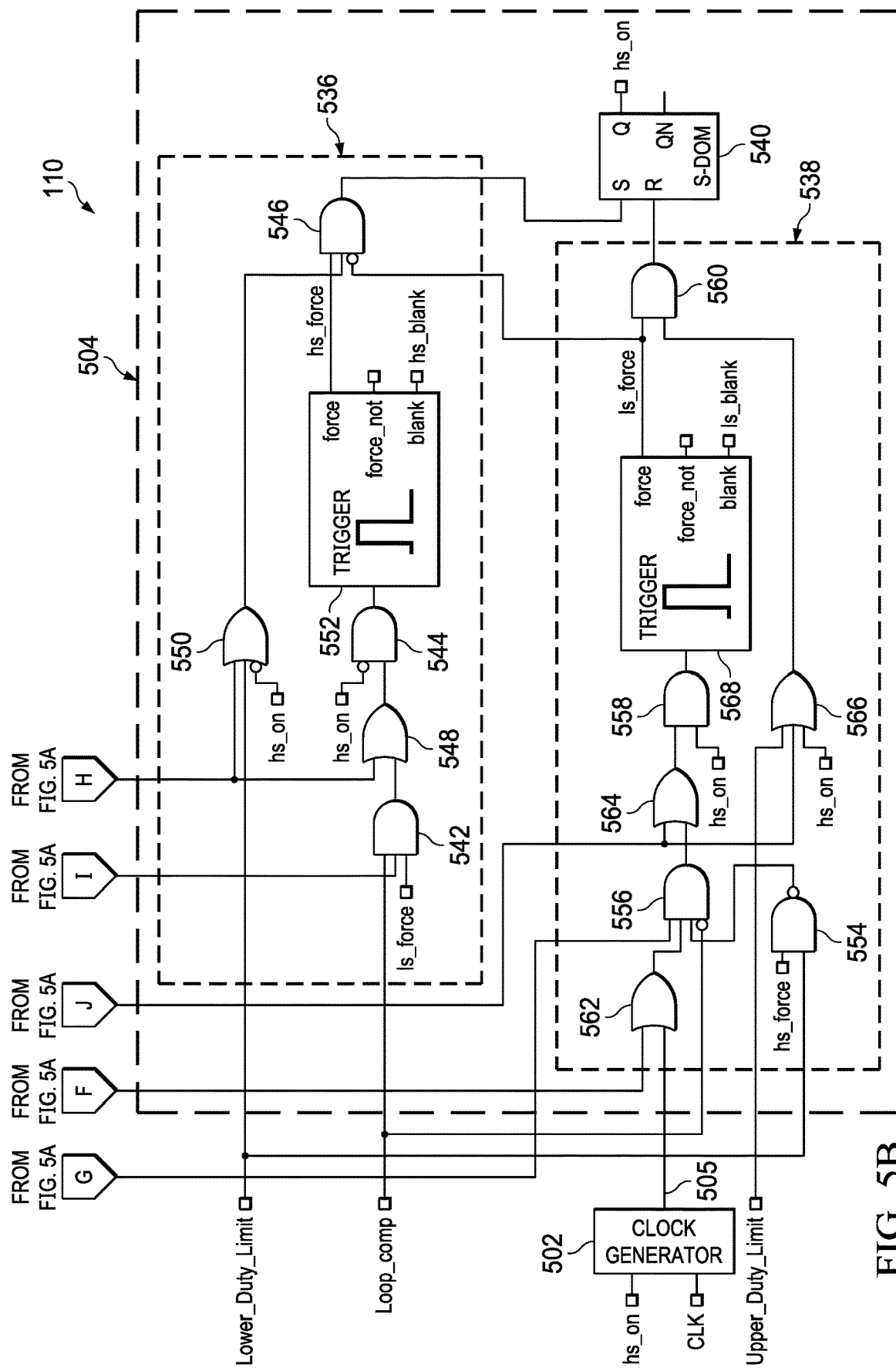

FIGS. 5A and 5B show a schematic diagram of the example switching regulator control circuit 110, in accordance with various examples. The switching regulator control circuit 110 includes a current limit indicator circuit 500 (FIG. 5A), a clock generator circuit 502 (FIG. 5B), and a driver latching circuit 504 (FIG. 5B). The current limit indicator circuit 500 receives the inputs HS_Upper_Limit, LS_Upper__Limit, HS_Lower__Limit, and LS_Lower_Limit and is coupled to the driver latching circuit 504. The clock generator circuit 502 is coupled to the driver latching circuit 504 and receives a clock signal CLK. The clock signal CLK provides a switching frequency of the power converter circuit 104. The clock generator circuit 502 may be any circuit that generates a signal to switch a LS transistor on and a HS transistor off responsive to the output signal hs_on and to the clock signal CLK. The driver latching circuit 504 receives the inputs Loop_comp, Upper_Duty_Limit, and Lower_Duty_Limit and is coupled to the current limit indicator circuit 500 and to the clock generator circuit 502. The driver latching circuit 504 receives an output 505 of the clock generator circuit 502 and is configured to generate the output signal hs_on.

In examples, the current limit indicator circuit 500 (FIG. 5A) includes AND gates 506, 508, 510, 512, 514, 516, 518, and 520; NOR gates 522 and 524; OR gates 526 and 528; and latches 530, 532, and 534. The latches 530, 532, 534 may be SR flip flops. In some examples, the latches 530, 532, 534 may be set dominated SR flip flops. In some examples, the latches 530, 532, 534 may be any device able to maintain an output state until an external trigger is received, such as a D flip flop or a bistable multivibrator.

A first input of the NOR gate 522 receives a blanking time signal ls_blank from the driver latching circuit 504 (FIG. 5B). A second input of the NOR gate 522 receives a blanking time signal hs_blank from the driver latching circuit 504 (FIG. 5B). An output of the NOR gate 522 is coupled to a first input of the AND gate 516 and a first input of the AND gate 520. A first input of the AND gate 506 receives the output signal hs_on of the driver latching circuit 504 (FIG. 5B); a second input of the AND gate 506 receives the input HS_Lower_Limit; and an output of the AND gate 506 is coupled to a first input of the OR gate 526. A first input of the AND gate 508 receives an inverted signal of the output signal hs_on; a second input of the AND gate 508 receives the input LS_Lower_Limit; and an output of the AND gate 508 is coupled to a second input of the OR gate 526. The inputs of the OR gate 526 couple to the outputs of the AND gates 506, 508; and an output of the OR gate 526 is coupled to a second input of the AND gate 516.

A first input of the AND gate 510 receives the output signal hs_on; a second input of the AND gate 510 receives the input HS_Upper_Limit; and an output of the AND gate 510 is coupled to a first input of the OR gate 528. A first input of the AND gate 512 receives an inverted signal of the output signal hs_on; a second input of the AND gate 512 receives the input LS_Upper_Limit and an output of the AND gate 512 is coupled to a second input of the OR gate 528. The inputs of the OR gate 528 couple to the outputs of the AND gates 510, 512; and an output of the OR gate 528 is coupled to a second input of the AND gate 520.

The inputs of the AND gate 516 couple to the outputs of the NOR gate 522 and the OR gate 526; and an output of the AND gate 516 is coupled to a first input of the AND gate 514 and to an input S of the latch 532. The inputs of the AND gate 520 couple to the outputs of the NOR gate 522 and the OR gate 528; and an output of the AND gate 520 is coupled to an input S of the latch 534.

The first input of the AND gate 514 is coupled to the output of the AND gate 516; a second input of the AND gate 514 receives an inverted signal of the output signal hs_on; and an output of the AND gate 514 is coupled to an input S of the latch 530. The input S of the latch 530 is coupled to the output of the AND gate 514; an input R of the latch 530 receives the blanking time signal ls_blank; and an output Q of the latch 530 is coupled to the driver latching circuit 504 (FIG. 5B).

The AND gate 518 receives the output signal hs_on and to receive an inverted signal of a transistor forcing signal hs_force from the driver latching circuit 504; an output of the AND gate 518 is coupled to an R input of the latch 532. The input S of the latch 532 is coupled to the output of the AND gate 516 and to the first input of the AND gate 514; the input R of the latch 532 is coupled to the output of the AND gate 518; and outputs Q and QN of the latch 532 couple to the driver latching circuit 504 (FIG. 5B).

The NOR gate 526 receives the output signal hs_on and to receive a transistor forcing signal ls_force; and an output of the NOR gate 526 is coupled to an R input of the latch 534. The input S of the latch 534 is coupled to the output of the AND gate 520; the input R of the latch 534 is coupled to the output of the NOR gate 526, and outputs Q and QN of the latch 534 couple to the driver latching circuit 504 (FIG. 5B).

In examples, the driver latching circuit 504 (FIG. 5B) includes a HS force circuit 536 to generate the transistor forcing signal hs_force and the blanking time signal hs_blank; a LS force circuit 538 to generate the transistor forcing signal ls_force and the blanking time signal ls_blank; and a latch 540 to generate the output signal hs_on. The transistor forcing signal hs_force may be a signal to indicate the HS transistor is to be forced to switch on or to remain on. The transistor forcing signal ls_force may be a signal to indicate the LS transistor is to be forced to switch on or to remain on. The latch 540 may be an SR flip flop, for example. In some examples, the latch 540 may be a set dominated SR flip flop. In some examples, the latch 540 may be any device able to maintain an output state until an external trigger is received, such as a D flip flop or a bistable multivibrator. The HS force circuit 536 receives the inputs Loop_comp and Lower_Duty_Limit and is coupled to the output Q of the latch 532 (FIG. 5A), to the output QN of the latch 534 (FIG. 5A), to the LS force circuit 538, and to an input S of the latch 540. The LS force circuit 538 receives the inputs Loop_comp, Lower_Duty_Limit, and Upper_Duty_Limit and is coupled to the output Q of the latch 530 (FIG. 5A), to the output QN of the latch 532 (FIG. 5A), to the output Q of the latch 534 (FIG. 5A), to the clock generator circuit 502, to the HS force circuit 536, and to an input R of the latch 540.

The HS force circuit 536 (FIG. 5B), in some examples, includes AND gates 542, 544, and 546; OR gates 548 and 550; and a one shot circuit 552. A first input of the AND gate 542 receives the input Loop_comp; a second input of the AND gate 542 is coupled to the output QN of the latch 534 (FIG. 5A); a third input of the AND gate 542 receives an inverted signal of the transistor forcing signal ls_force of the LS force circuit 538; and an output of the AND gate 542 is coupled to a first input of the OR gate 548. The first input of the OR gate 548 is coupled to the output of the AND gate 542; a second input of the OR gate 548 is coupled to the output Q of the latch 532 (FIG. 5A) and to a first input of the OR gate 550; and an output of the OR gate 548 is coupled to a first input of the AND gate 544. The first input of the AND gate 544 is coupled to the output of the OR gate 548; a second input of the AND gate 544 receives an inverted signal of the output signal hs_on; and an output of the AND gate 544 is coupled to an input trigger of the one shot circuit 552. The one shot circuit 552 is coupled to the output of the AND gate 544 and is configured to generate the transistor forcing signal hs_force at an output force and the blanking time signal hs_blank at an output blank responsive to a high output of the AND gate 544. The one shot circuit 552 may be any circuit to generate pulse signals having predefined durations responsive to a trigger. In some examples, the one shot circuit 552 may generate pulse signals having different predefined durations. For example, the transistor forcing signal hs_force may have a duration of 30 ns, and the blanking time signal hs_blank may have a duration of 28 ns.

The first input of the OR gate 550 is coupled to the second input of the OR gate 548 and to the output Q of the latch 532 (FIG. 5A); a second input of the OR gate 550 receives an inverted signal of the output signal hs_on; a third input of the OR gate 550 receives the input Lower_Duty_Limit; and an output of the OR gate 550 is coupled to a first input of the AND gate 546. The first input of the AND gate 546 is coupled to the output of the OR gate 550; a second input of the AND gate 546 is coupled to the output force of the one shot circuit 552; a third input of the AND gate 546 receives an inverted signal of the transistor forcing signal ls_force of the LS force circuit 538; and an output of the AND gate 546 is coupled to the input S of the latch 540.

In some examples, the LS force circuit 538 (FIG. 5B) includes a NAND gate 554; AND gates 556, 558, and 560; OR gates 562, 564, and 566; and a one shot circuit 568. A first input of the OR gate 562 is coupled to the output Q of the latch 530 (FIG. 5A); a second input of the OR gate 562 is coupled to an output of the clock generator circuit 502; and an output of the OR gate 562 is coupled to a first input of the AND gate 556. A first input of the NAND gate 554 receives the transistor forcing signal hs_force; a second input of the NAND gate 554 receives the input Lower_Duty_Limit; and an output of the NAND gate 554 is coupled to a second input of the AND gate 556. The first input of the AND gate 556 is coupled to the output of the OR gate 562; the second input of the AND gate 556 is coupled to the output of the NAND gate 554; a third input of the AND gate 556 receives an inverted signal of the input Loop_comp; and a fourth input of the AND gate 556 is coupled to the output QN of the latch 532 (FIG. 5A); and an output of the AND gate 556 is coupled to a first input of the OR gate 564.

The first input of the OR gate 564 is coupled to the output of the AND gate 556; a second input of the OR gate 564 is coupled to the output Q of the latch 534 (FIG. 5A) and to a first input of the OR gate 566; and an output of the OR gate 564 is coupled to a first input of the AND gate 558. The first input of the AND gate 558 is coupled to the output of the OR gate 564; a second input of the AND gate 558 receives the output signal hs_on; and an output of the AND gate 558 is coupled to an input trigger of the one shot circuit 568. The one shot circuit 568 is coupled to the output of the AND gate 558 and is configured to generate the transistor forcing signal ls_force at an output force and the blanking time signal ls_blank at an output blank responsive to a high output of the AND gate 558. The one shot circuit 568 may be any circuit to generate pulse signals having predefined durations responsive to a trigger. In some examples, the one shot circuit 568 may generate pulse signals having different predefined durations. For example, the transistor forcing signal ls_force may have a duration of 30 ns, and the blanking time signal ls_blank may have a duration of 28 ns.

The first input of the OR gate 566 is coupled to the second input of the OR gate 564 and to the output Q of the latch 534 (FIG. 5A); a second input of the OR gate 566 receives the inverted input Upper_Duty_Limit; a third input of the OR gate 566 receives the output signal hs_on; and an output of the OR gate 566 is coupled to a first input of the AND gate 560. The first input of the AND gate 560 is coupled to the output of the OR gate 566; a second input of the AND gate 560 is coupled to the output force of the one shot circuit 568 and to the third input of the AND gate 546; and an output of the AND gate 560 is coupled to an input R of the latch 540.

Operation of the switching regulator control circuit 110 is now described. In examples, the switching regulator control circuit 110 may implement the method 400 described above with respect to FIG. 4. In some examples, the switching regulator control circuit 110 may include a different combination of logic gates, latches, and signal generator circuits to implement the method 400. Responsive to the HS transistor 210 having an on state, as indicated by a high output signal hs_on and the low signal ls_force, the output of the NOR gate 526 (FIG. 5A) is driven low. Responsive to the low output of the NOR gate 526, the input R of the latch 534 (FIG. 5A) is driven low. Responsive to a high input HS_Upper_Limit indicating that an HS upper current limit level has been exceeded and the high output signal hs_on, the outputs of the AND gate 510 (FIG. 5A) and the OR gate 528 (FIG. 5A) are driven high. Responsive to both inputs of the AND gate 520 (FIG. 5A) being driven high, the input S of the latch 534 (FIG. 5A) is driven high. The high input S and the low input R of the latch 534 drive the output Q of the latch 534 high and the output QN of the latch 534 low. The high output Q of the latch 534 drives the output of the OR gate 564 (FIG. 5B) high. Responsive to the high output of the OR gate 564 and the high output signal hs_on, the output of the AND gate 558 (FIG. 5B) is driven high and the one shot circuit 568 (FIG. 5B) is triggered. Responsive to receiving the trigger signal, the one shot circuit 568 generates a high blanking time signal ls_blank and a high transistor forcing signal ls_force. Because the output Q of the latch 534 (FIG. 5A) having a high state triggers the one shot circuit 568 (FIG. 5B), in some examples, the latch 534 enables forcing the LS transistor on for a duration equal to the blanking time. The high transistor forcing signal ls_force drives the output of the AND gate 546 (FIG. 5B) low. The low output of the AND gate 546 drives the input S of the latch 540 (FIG. 5B) low. The high output Q of the latch 534 (FIG. 5A) drives the output of the OR gate 566 (FIG. 5B) high. The high output of the OR gate 566 and the high transistor forcing signal ls_force drives the output of the AND gate 560 (FIG. 5B) high. The high output of the AND gate 560 drives the input R of the latch 540 (FIG. 5B) high. The low input S and high input R of the latch 540 drive the output signal hs_on low.

Responsive to the high blanking time signal ls_blank, the output of the NOR gate 522 (FIG. 5A) is driven low. Responsive to the low output of the NOR gate 522, the output of the AND gate 520 (FIG. 5A) is driven low. The low output of the AND gate 520 drives the input S of the latch 534 (FIG. 5A) low. Responsive to the high transistor forcing signal ls_force and the low output signal hs_on, the output of the NOR gate 526 (FIG. 5A) is low. The low output of the NOR gate 526 drives the input R of the latch 534 low. The low inputs S and R of the latch 534 indicate the output Q of the latch 534 retains its prior high value. Because a low input of the AND gate 520 results in a low output of the AND gate 520, the AND gate 520 may be referred to as blocking an over current protection monitoring during a blanking time indicated by either a high blanking time signal ls_blank or a high blanking time signal hs_blank. Responsive to the blanking time signal ls_blank returning to a low state after the blanking time has elapsed, over current protection monitoring resumes.

Responsive to the low output signal hs_on and the input LS_Upper_Limit indicating that a current of the output circuit 114 is greater than the LS upper current limit level, the output of the AND gate 512 (FIG. 5A) is driven high. The high output of the AND gate 512 drives the output of the OR gate 528 (FIG. 5A) high. The high output of the OR gate 528 and the high output of the NOR gate 522 (FIG. 5A) drive the output of the AND gate 520 (FIG. 5A) high. The high output of the AND gate 520 drives the input S of the latch 534 (FIG. 5A) high. Responsive to the high input S and low input R of the latch 534, the output QN of the latch 534 is driven low. The low output QN of the latch 534 drives the output of the AND gate 542 (FIG. 5B) low. The low output of the AND gate 542 prevents triggering of the one shot circuit 552 (FIG. 5B) and the LS transistor remains on. Responsive to the transistor forcing signal ls_force returning to a low state after the forcing time has elapsed and the low output signal hs_on, the output of the NOR gate 526 (FIG. 5A) is driven high. The high output of the NOR gate 526 drives the input R of the latch 534 (FIG. 5A) high. Responsive to the input LS_Upper_Limit indicating that a current of the output circuit 114 is less than the LS upper current limit level, the output of the AND gate 512 (FIG. 5A) is driven low. The low output of the AND gate 512 and a low output of the AND gate 510 responsive to the input HS_Upper_Limit indicating that the current of the output circuit 114 is less than the HS upper current limit level drive the output of the OR gate 528 (FIG. 5A) low. The low output of the OR gate 528 drives the output of the AND gate 520 (FIG. 5A) low. The low output of the AND gate 520 drives the input S of the latch 534 low. Responsive to the low input S and high input R of the latch 534, the output QN of the latch 534 is driven high. The high output QN of the latch 534, a high input Loop_comp, and the low transistor force signal ls_force drive the output of the AND gate 542 (FIG. 5B) high. The high output of the AND gate 542 drives an output of the OR gate 548 (FIG. 5B) high. The high output of the OR gate 548 and a low output signal hs_on drive the output of the AND gate 544 (FIG. 5B) high. The high output of the AND gate 544 triggers the one shot circuit 552 (FIG. 5B).

Referring to a normal operation state, responsive to the LS transistor 222 having an on state, as indicated by a low output signal hs_on, a high input LS_Lower_Limit drives the output of the AND gate 508 (FIG. 5A) high. The high output of the AND gate 508 drives the output of the OR gate 526 (FIG. 5A) high. Responsive to low blanking time signals ls_blank, hs_blank, the output of the NOR gate 522 (FIG. 5A) is high. Responsive to high inputs, the output of the AND gate 516 (FIG. 5A) is driven high. The high output of the AND gate 516 drives the input S of the latch 532 (FIG. 5A) high. The input R of the latch 532 is driven low responsive to the low output signal hs_on. Responsive to the high input S and low input R of the latch 532, the output Q of the latch 532 is driven high. The high output Q of the latch 532 drives the output of the OR gate 548 (FIG. 5B) high. The high output of the OR gate 548 and low output signal hs_on drive the output of the AND gate 544 (FIG. 5B) high. The high output of the AND gate 544 triggers the one shot circuit 552 (FIG. 5B). Responsive to receiving the trigger signal, the one shot circuit 552 generates a high blanking time signal hs_blank and a high transistor forcing signal hs_force. Because the output Q of the latch 532 having a high state triggers the one shot circuit 552, in some examples, the latch 532 (FIG. 5A) enables forcing the HS transistor on for a duration equal to the blanking time. The high transistor forcing signal hs_force drives the output of the AND gate 546 (FIG. 5B) high. The high output of the AND gate 546 drives the input S of the latch 540 (FIG. 5B) high. The high input S and low input R of the latch 540 drive the output signal hs_on high.

Responsive to the high blanking time signal hs_blank, the output of the NOR gate 522 (FIG. 5A) is driven low. Responsive to the low output of the NOR gate 522, the output of the AND gate 516 (FIG. 5A) is driven low. The low output of the AND gate 516 drives the input S of the latch 532 (FIG. 5A) low. Responsive to the high transistor forcing signal hs_force, the output of the AND gate 518 (FIG. 5A) is low. The low output of the AND gate 518 drives the input R of the latch 532 low. The low inputs S and R of the latch 532 indicate the output Q of the latch 532 retains its prior high value. Because a low input of the AND gate 516 results in a low output of the AND gate 516, the AND gate 516 may be referred to as blocking an over current protection monitoring during a blanking time as indicated by either a high blanking time signal ls_blank or a high blanking time signal hs_blank. Responsive to the blanking time signal hs_blank returning to a low state after the blanking time has elapsed, over current protection monitoring resumes.

Responsive to the high output signal hs_on and the input HS_Lower_Limit indicating that a current of the output circuit 114 is less than the HS lower current limit level, the output of the AND gate 506 (FIG. 5A) is driven high. The high output of the AND gate 506 drives the output of the OR gate 526 (FIG. 5A) high. The high output of the OR gate 526 and the high output of the NOR gate 522 (FIG. 5A) drive the output of the AND gate 516 (FIG. 5A) high. The high output of the AND gate 516 drives the input S of the latch 532 (FIG. 5A) high. Responsive to the high transistor forcing signal hs_force, the output of the AND gate 518 (FIG. 5A) is low. The low output of the AND gate 518 drives the input R of the latch 532 low. Responsive to the high input S and low input R of the latch 534, the output QN of the latch 534 (FIG. 5A) is driven low. The low output QN of the latch 532 drives the output of the AND gate 556 (FIG. 5B) low. The low output of the AND gate 556 prevents triggering of the one shot circuit 568 (FIG. 5B) and the HS transistor remains on.

Responsive to the transistor forcing signal hs_force returning to a low state after the forcing time has elapsed and the high output signal hs_on, the output of the AND gate 518 (FIG. 5A) is driven high. The high output of the AND gate 518 drives the input R of the latch 532 (FIG. 5A) high. Responsive to the input HS_Lower_Limit indicating that a current of the output circuit 114 is greater than the lower current limit level associated with the HS transistor, the output of the AND gate 506 (FIG. 5A) is driven low. The low output of the AND gate 506 and a low output of the AND gate 508 (FIG. 5A) responsive to the input LS_Lower_Limit indicating that the current of the output circuit 114 is greater than the LS lower current limit level, the output of the OR gate 526 (FIG. 5A) is driven low. The low output of the OR gate 526 drives the output of the AND gate 516 (FIG. 5A) low. The low output of the AND gate 516 drives the input S of the latch 532 (FIG. 5A) low. Responsive to the low input S and high input R of the latch 532, the output QN of the latch 532 is driven high. Responsive to the high output QN of the latch 532, a low input Loop_comp, an enable signal for the LS transistor generated by the clock generator circuit 502 (FIG. 5B), and a high input Lower_Duty_Limit may drive the output of the AND gate 556 (FIG. 5B) high, for example. The high output of the AND gate 556 drives an output of the OR gate 564 (FIG. 5B) high. The high output of the OR gate 564 and a high output signal hs_on drive the output of the AND gate 558 (FIG. 5B) high. The high output of the AND gate 558 triggers the one shot circuit 568 (FIG. 5B).

As described above, the current limit indicator circuit 500 is configured to determine, based on the inputs received (e.g., an indication that the current of the output circuit 114 has a value that is greater than a first current limit level or a third current limit level or has a value that is less than a second current limit level or a fourth current limit level), a switching condition of the switching regulator control circuit 110. The current limit indicator circuit 500 is configured to indicate the switching condition. Responsive to the indication, the driver latching circuit 504 is configured to generate a control signal (e.g., output signal hs_on) to cause the switching regulator circuit 112 to switch. Because the driver latching circuit 504 is configured to generate the control signal based, at least in part, on the inputs received by the current limit indicator circuit 500, the driver latching circuit 504 may be referred to as configured to control the switching regulator circuit 112 based on the inputs.

Responsive to the control signal generated by the switching regulator control circuit 110, the switching regulator circuit 112 drives the current of the output circuit 114 between a first current that is below the upper limit level associated with the HS transistor and a second current that is above the upper limit level associated with the LS transistor. Responsive to the control signal generated by the switching regulator control circuit 110, the switching regulator circuit 112 drives the current of the output circuit 114 between a third current that is above the lower limit level associated with the LS transistor and a fourth current that is below the lower limit level associated with the HS transistor.

In some examples, in accordance with the method 400 and the diagram 300, the switching regulator control circuit 110 implements forcing of the LS transistor 222 and the HS transistor 210 based on a duty cycle. The OR gate 550 and AND gate 546 enable blocking of the transistor force signal hs_force responsive to the input Lower_Duty_Limit indicating that a duty cycle is below the lower duty limit and that forcing of the HS transistor 210 is not allowed. The OR gate 566 and AND gate 560 enable blocking of the transistor force signal ls_force responsive to a signal at the input Upper_Duty_Limit indicating that a duty cycle is above the upper duty limit and that forcing of the LS transistor 222 is not allowed.

Figure 6:
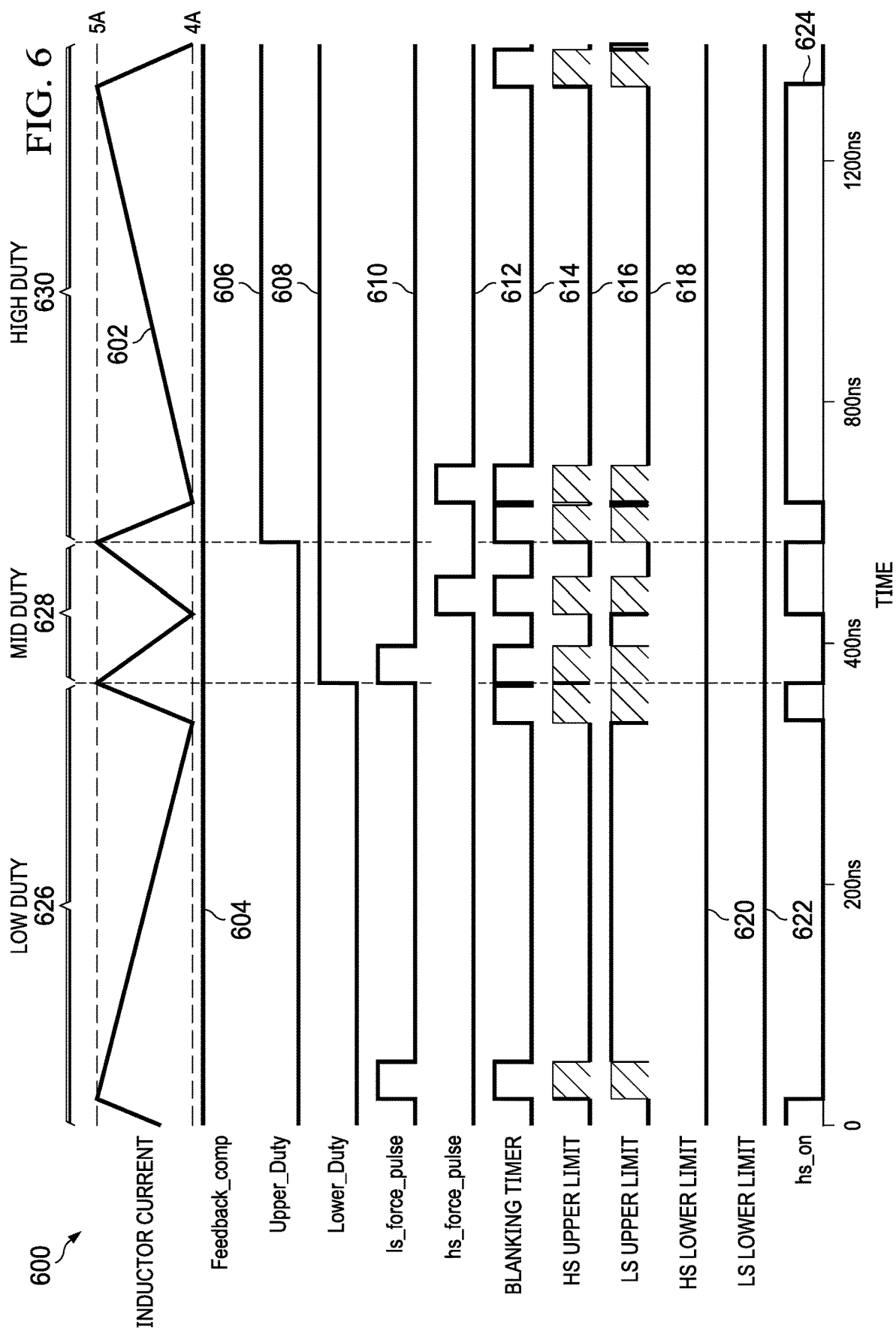
FIG. 6 is a timing diagram of an example power converter circuit in accordance with various examples.

FIG. 6 is a timing diagram 600 of an example power converter circuit in accordance with various examples. The power converter circuit may be the power converter circuit 104 (FIGS. 1 and 2), for example. An x-axis of the timing diagram 600 shows a time in ns. The y-axis of the timing diagram 600 shows a waveform 602 of a signal INDUCTOR CURRENT; a waveform 604 of a signal Feedback_comp of a voltage feedback circuit; a waveform 606 of a signal Upper_Duty of an upper duty cycle limit comparator; a waveform 608 of a signal Lower_Duty of a lower duty cycle limit comparator; a waveform 610 of a transistor forcing signal ls_force_pulse for forcing a LS transistor on; a waveform 612 of a transistor forcing signal hs_force pulse for forcing a HS transistor on; a waveform 614 of a signal BLANKING TIMER that indicates whether a blanking time signal for the LS transistor or the HS transistor is enabled; a waveform 616 of a signal HS UPPER LIMIT of a comparator for comparing a sensed voltage associated with the signal INDUCTOR CURRENT to a reference voltage associated with a HS upper current limit level; a waveform 618 of a signal LS UPPER LIMIT of a comparator for comparing the sensed voltage associated with the signal INDUCTOR CURRENT to a reference voltage associated with an LS upper current limit level; a waveform 620 of a signal HS LOWER LIMIT of a comparator for comparing the sensed voltage associated with the signal INDUCTOR CURRENT to a HS lower current limit level; a waveform 622 of a signal LS LOWER LIMIT of a comparator for comparing the sensed voltage associated with the signal INDUCTOR CURRENT to a reference voltage associated with a LS lower current limit level; and a waveform 624 of an output signal hs_on of a switching regulator control circuit.

The signal INDUCTOR CURRENT may be the current of the output circuit 114 as measured at the switching node 220, for example. The signal Feedback_comp may be the output of the comparator 200, for example. For example, the signal Upper_Duty may be the output of the comparator 206. The signal Lower_Duty may be the output of the comparator 208, for example. The signal BLANKING TIMER may be an output of an OR gate (not expressly shown in the current limit indicator circuit 500 (FIG. 5A)) having the blanking time signals ls_blank, hs_blank (FIG. 5B) as inputs, for example. The comparator generating the signal HS UPPER LIMIT may be the comparator 212, for example. The comparator generating the signal LS UPPER LIMIT may be the comparator 214, for example. The comparator generating the signal HS LOWER LIMIT may be the comparator 216, for example. The comparator generating the signal LS LOWER LIMIT may be the comparator 218, for example. The output signal hs_on of the switching regulator control circuit may be the output signal hs_on of the switching regulator control circuit 110, for example.

Referring to the waveforms of FIG. 6 along with FIGS. 2, 5A, and 5B, in some examples, during a Low duty cycle time period 626, the output signal hs_on is high at a starting time of 0 ns. Responsive to the high output signal hs_on, the driver circuit 226 switches the HS transistor 210 on and switches the LS transistor 222 off. Responsive to the HS transistor 210 switching on, the signal INDUCTOR CURRENT is provided at the switching node 220 and the signal VOUT is provided at the output node 211. The voltage of the signal VOUT is below the voltage VREF and the comparator 200 generates the signal Feedback_comp having a high value. The voltage of the signal VOUT is below a product of the gain of 0.3 of the amplifier circuit 204 multiplied by the reference signal VIN, and the comparator 208 generates the signal Lower_Duty having a low value. The voltage of the signal VOUT is also below a product of the gain of 0.7 of the amplifier circuit 202 multiplied by the reference signal VIN, and the comparator 206 generates the signal Upper_Duty having a low value. At approximately 20 ns, responsive to the sensed voltage having a value less than the reference voltage 5 A_ref_voltage, the signal HS UPPER LIMIT goes high. The high signal HS UPPER LIMIT triggers the one shot circuit 568 to generate a transistor forcing signal ls_force and a blanking time signal ls_blank. Responsive to the blanking time signal ls_blank, the signal BLANKING TIMER goes high. Responsive, at least in part, to the transistor forcing signal ls_force, the signal ls_force_pulse goes high. The signal ls_force_pulse remains high for a duration equal to the forcing time (e.g., 30 ns). Responsive to the high transistor forcing signal ls_force, the output signal hs_on of the latch 540 is driven low. Responsive to the low output signal hs_on, the HS transistor 210 is switched off and the LS transistor 222 is switched on.

The blanking time signal ls_blank and the signal BLANKING TIMER remain high for a duration equal to the blanking time (e.g., 28 ns). During the blanking time, over current protection is enabled and measurements of the sensed voltage are ignored by the switching regulator control circuit 110, as indicated by the shading of the waveforms 616, 618. After the blanking time and the forcing time have elapsed, at approximately 50 ns, as indicated by the low signals ls_force_pulse, BLANKING TIMER, the signal HS UPPER LIMIT is low and the signal LS UPPER LIMIT is high. Responsive to the high signal LS LOWER LIMIT, the output signal hs_on remains low and the LS transistor 222 remains switched on. At approximately 330 ns, responsive to the sensed voltage having a value that is greater than the reference voltage 4 A_ref_voltage, the signal LS UPPER LIMIT is driven low. Responsive to the high signal Feedback_comp and the low signal LS UPPER LIMIT, the output signal hs_on of the latch 540 is driven high. Responsive to the low signal Lower_Duty, the signal hs_force_pulse is blocked. Responsive to the high output signal hs_on, the HS transistor 210 is switched on for a duration equal to the signal BLANKING TIMER and the LS transistor 222 is switched off. Because the LS transistor 222 remains on until the sensed voltage has a value that is greater than the reference voltage 4 A_ref_voltage, the inductor current does not exceed the HS upper current limit level responsive to the HS transistor 210 switching on and staying on for the blanking time, as indicated by the signal INDUCTOR CURRENT.

Still referring to the waveforms of FIG. 6 along with FIGS. 2 and 5, in some examples, during a Mid-duty cycle time period 628, at approximately 358 ns, the signal Lower_Duty is driven high responsive to the duty cycle exceeding a lower duty cycle limit. Responsive to the sensed voltage less than the reference voltage 5 A_ref_voltage, the signal HS UPPER LIMIT goes high. The high signal HS UPPER LIMIT triggers the one shot circuit 568 to generate a transistor forcing signal ls_force and a blanking time signal ls_blank. Responsive to the blanking time signal ls_blank, the signal BLANKING TIMER goes high. Responsive, at least in part, to the transistor forcing signal ls_force, the signal ls_force_pulse goes high. The signal ls_force_pulse remains high for a duration equal to the forcing time (e.g., 30 ns). Responsive to the high transistor forcing signal ls_force_pulse, the output signal hs_on of the latch 540 is driven low. Responsive to the low output signal hs_on, the HS transistor 210 is switched off and the LS transistor 222 is switched on.

The blanking time signal ls_blank and the signal BLANKING TIMER remain high for a duration equal to the blanking time (e.g., 28 ns). After the forcing time have elapsed, at approximately 388 ns, as indicated by the low signals ls_force_pulse, the signal HS UPPER LIMIT is low and the signal LS UPPER LIMIT is high. Responsive to the high signal LS LOWER LIMIT, the output signal hs_on remains low and the LS transistor 222 remains switched on. At approximately 420 ns, responsive to the sensed voltage having a value that is greater than the reference voltage 4 A_ref_voltage, the signal LS_Upper_Limit is driven low. Responsive to the high signal Feedback_comp and the low signal LS UPPER LIMIT trigger the one shot circuit 552 to generate a transistor forcing signal hs_force and a blanking time signal hs_blank. Responsive to the blanking time signal hs_blank, the signal BLANKING TIMER goes high. Responsive, at least in part, to the transistor forcing signal hs_force, the signal hs_force_pulse goes high. The signal hs_force_pulse remains high for a duration equal to the forcing time (e.g., 30 ns). The blanking time signal ls_blank and the signal BLANKING TIMER remain high for a duration equal to the blanking time (e.g., 28 ns). Responsive to the high transistor forcing signal hs_force, the output signal hs_on of the latch 540 is driven high. Responsive to the high output signal hs_on, the HS transistor 210 is switched on and the LS transistor 222 is switched off. After the forcing time has elapsed, the sensed voltage has a value that is greater than the reference voltage 5 A_ref_voltage and the HS transistor 210 remains on. Because the HS transistor 210 remained on until the sensed voltage has a value that is less than the reference voltage 5 A_ref_voltage, the inductor current does not fall below the LS upper current limit level responsive to the LS transistor 222 switching on and staying on for the forcing time, as indicated by the signal INDUCTOR CURRENT. Because the LS transistor 222 remained on until the sensed voltage has a value that is greater than the reference voltage 4 A_ref_voltage, the inductor current does not exceed the HS upper current limit level responsive to the HS transistor 210 switching on and staying on for the forcing time, as indicated by the signal INDUCTOR CURRENT.

Still referring to the waveforms of FIG. 6 along with FIGS. 2 and 5, in some examples, during a High duty cycle time period 630, at approximately 580 ns, the signal Upper_Duty is driven high responsive to the duty cycle exceeding an upper duty cycle limit. Responsive to the sensed voltage having a value that is less than the reference voltage 5 A_ref_voltage, the signal HS UPPER LIMIT is driven high. Responsive to the high signal HS UPPER LIMIT, the LS transistor 222 is switched on for a duration of the signal BLANKING TIMER. Responsive to the high signal Upper_Duty, the signal ls_force is blocked. At approximately 608 ns, after the blanking duration has elapsed, the signal LS UPPER LIMIT indicates the sensed voltage has a value greater than the reference voltage 4 A_ref_voltage. Responsive to the indication, the one shot circuit 552 generates a high transistor forcing signal hs_force and a high blanking time signal hs_blank. Responsive to the blanking time signal hs_blank, the output BLANKING TIMER goes high. Responsive, at least in part, to the transistor forcing signal hs_force, the signal hs_force_pulse goes high. Responsive to the high transistor forcing signal hs_force, the output signal hs_on is driven high. After the forcing time has elapsed, the sensed voltage has a value that is greater than the reference voltage 5 A_ref_voltage and the HS transistor 210 remains on. The output signal hs_on remains high until the sensed voltage has a value less than the reference voltage 5 A_ref_voltage at approximately 1300 ns. Responsive to sensed voltage having a value less than the reference voltage 5 A_ref_voltage, the output signal hs_on of the latch 540 is driven low. Responsive to the low output signal hs_on, the HS transistor 210 is switched off and the LS transistor 222 is switched on for a duration equal to the blanking time. Because the HS transistor 210 remained on until the sensed voltage has a value that is less than the reference voltage 5 A_ref_voltage, the inductor current does not fall below the LS upper current limit level responsive to the LS transistor 222 switching on and staying on for the forcing time, as indicated by the signal INDUCTOR CURRENT.

FIG. 7 is a timing diagram 700 of an example power converter circuit in accordance with various examples. The power converter circuit may be the power converter circuit 104, for example. An x-axis of the timing diagram 700 shows a time in ns. The y-axis of the timing diagram 700 shows a waveform 702 of a signal INDUCTOR CURRENT; a waveform 704 of a signal Feedback_comp of a voltage feedback circuit; a waveform 706 of a signal Upper_Duty of an upper duty cycle limit comparator; a waveform 708 of a signal Lower_Duty of a lower duty cycle limit comparator; a waveform 710 of a transistor forcing signal ls_force_pulse for forcing a LS transistor on; a waveform 712 of a transistor forcing signal hs_force_pulse for forcing a HS transistor on; a waveform 714 of a signal BLANKING TIMER that indicates whether a blanking time signal for the LS transistor or the HS transistor is enabled; a waveform 716 of a signal HS UPPER LIMIT of a comparator for comparing a sensed voltage associated with the signal INDUCTOR CURRENT to a reference voltage associated with a HS upper current limit level; a waveform 718 of a signal LS UPPER LIMIT of a comparator for comparing the sensed voltage associated with the signal INDUCTOR CURRENT to a reference voltage associated with an LS upper current limit level; a waveform 720 of a signal HS LOWER LIMIT of a comparator for comparing the sensed voltage associated with the signal INDUCTOR CURRENT to a HS lower current limit level; a waveform 722 of a signal LS LOWER LIMIT of a comparator for comparing the sensed voltage associated with the signal INDUCTOR CURRENT to a reference voltage associated with a LS lower current limit level; and a waveform 724 of an output signal hs_on of a switching regulator control circuit.

As described above with respect to FIG. 6, the signal INDUCTOR CURRENT may be the current of the output circuit 114 as measured at the switching node 220; the signal Feedback_comp may be the output of the comparator 200; the signal Upper_Duty may be the output of the comparator 206; the signal Lower_Duty may be the output of the comparator 208; the signal BLANKING TIMER may be an output of an OR gate having the blanking time signals ls_blank, hs_blank as inputs; the comparator generating the signal HS UPPER LIMIT may be the comparator 212; the comparator generating the signal LS UPPER LIMIT may be the comparator 214; the comparator generating the signal HS LOWER LIMIT may be the comparator 216; the comparator generating the signal LS LOWER LIMIT may be the comparator 218; and the output signal hs_on of the switching regulator control circuit may be the output signal hs_on of the switching regulator control circuit 110, for example.

Referring to the waveforms of FIG. 7 along with FIGS. 2 and 5, in some examples during a high duty cycle time period, the output signal hs_on is low at a starting time of 0 ns. Responsive to the low output signal hs_on, the driver circuit 226 switches the LS transistor 222 on and switches the HS transistor 210 off. Responsive to the LS transistor 222 switching on, the voltage of the signal VOUT has a value that is greater than the voltage VREF and the comparator 200 generates the signal Feedback_comp having a low value. During a high duty cycle time period, the voltage of the signal VOUT exceeds the product of the reference signal VIN multiplied by the gain of 0.3 of the amplifier circuit 204 and the comparator 208 generates the signal Lower_Duty having a high value. The voltage of the signal VOUT exceeds the product of the reference signal VIN multiplied by the gain of 0.7 of the amplifier circuit 202 and the comparator 206 generates the signal Upper_Duty having a high value. Responsive to the sensed voltage having a value greater than the reference voltage −2 A_ref_voltage after approximately 20 ns, the signal LS LOWER LIMIT is driven high. Responsive to the high signal LS LOWER LIMIT, the one shot circuit 552 generates a high transistor forcing signal hs_force and a high blanking time signal hs_blank. Responsive to the blanking time signal hs_blank, the signal BLANKING TIMER goes high. Responsive, at least in part, to the transistor forcing signal hs_force, the signal hs_force_pulse goes high. Responsive to the high transistor forcing signal hs_force, the output signal hs_on of the latch 540 is driven high. Responsive to the high output signal hs_on, the HS transistor 210 is switched on and the LS transistor 222 is switched off. After the forcing time has elapsed, at approximately 50 ns, the output HS LOWER LIMIT is high. Responsive to the high signal HS LOWER LIMIT, the output signal hs_on remains high and the HS transistor 210 remains switched on. Responsive to the sensed voltage having a value that is less than the reference voltage −1 A_ref_voltage, the signal HS LOWER LIMIT is driven low at approximately 360 ns. Responsive to the low signal HS LOWER LIMIT and the low signal Feedback_comp, the output signal hs_on is low. The low output signal hs_on switches the LS transistor 222 on. Because the high signal Upper_Duty blocks the signal ls_force and low signal Feedback_comp, the LS transistor 222 is on for a duration equal to the signal BLANKING TIMER. At approximately 388 ns, the sensed voltage has a value that is greater than the reference voltage −2 A_ref_voltage and the signal LS LOWER LIMIT goes high. The high signal LS LOWER LIMIT and low signal Feedback_comp drive the output signal hs_on high. The high output signal hs_on forces the HS transistor 210 on. At approximately 418 ns, the signal HS LOWER LIMIT is low and the HS transistor 210 remains on. Because the HS transistor 210 remained on until the sensed voltage had a value that is less than the reference voltage −1 A_ref_voltage, the inductor current does not fall below the LS lower current limit level responsive to the LS transistor 222 switching on and staying on for the blanking time, as indicated by the signal INDUCTOR CURRENT.

Figure 8A:
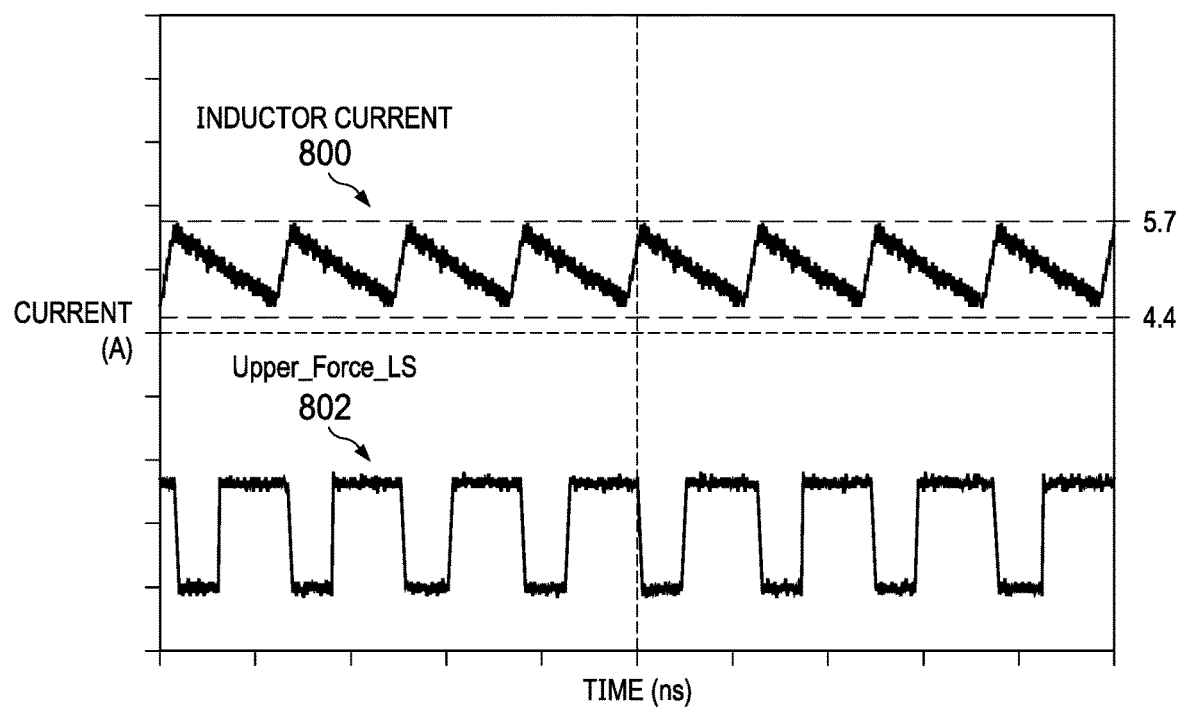
FIGS. 8A, 8B, and 8C are timing diagrams of an example power converter circuit in accordance with various examples.
Figure 8B:
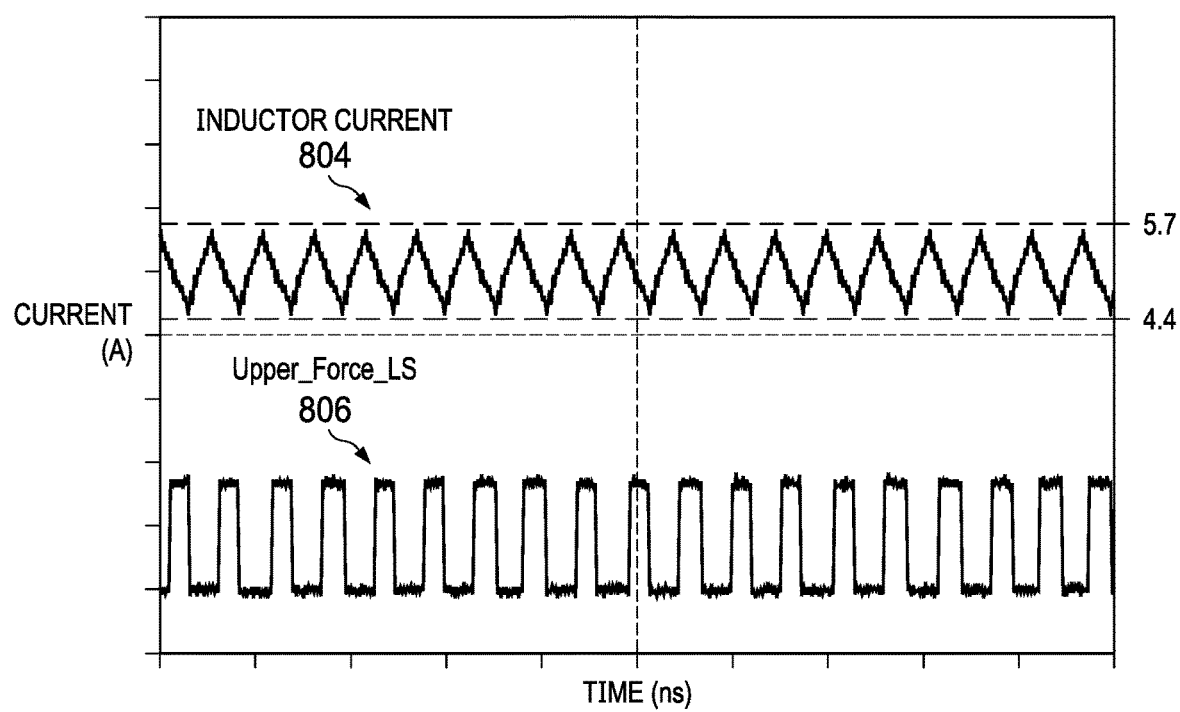
Figure 8C:
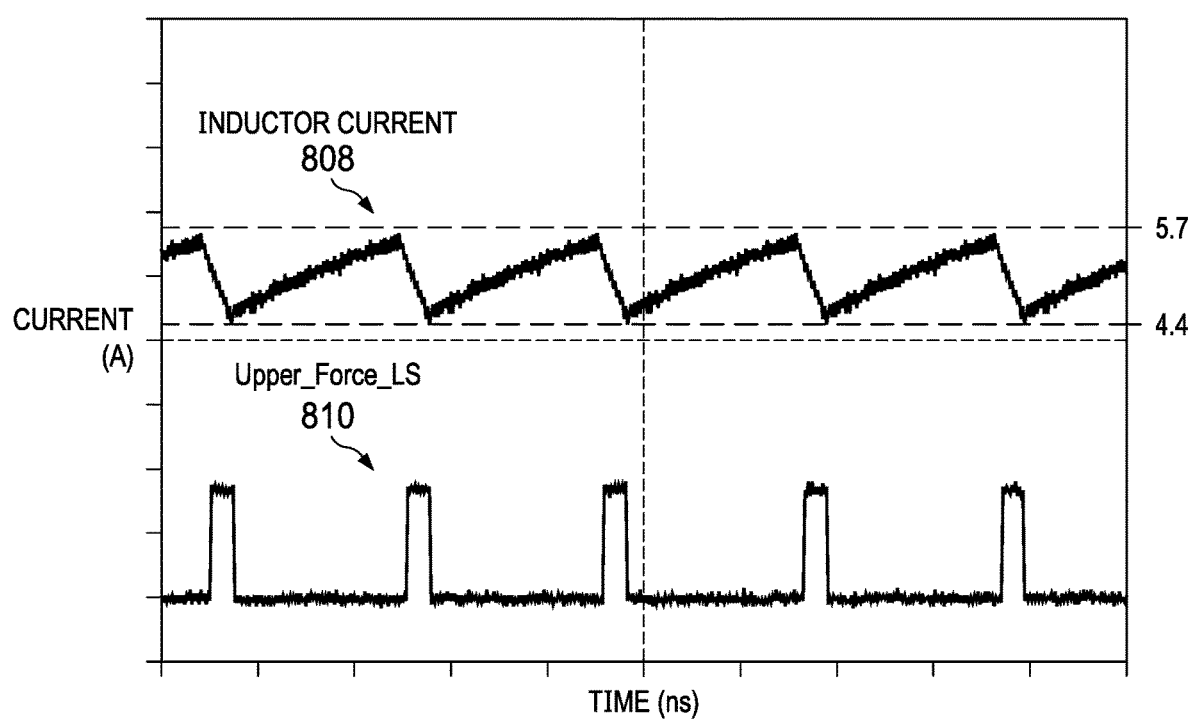

FIGS. 8A, 8A, and 8A are timing diagrams of an example power converter circuit in accordance with various examples. The power converter circuit may be the power converter circuit 104, for example. An x-axis of the timing diagrams is a time in ns. A y-axis of the timing diagrams is a current in Amperes. FIG. 8A includes a waveform 800 of a signal INDUCTOR CURRENT and a waveform 802 of a signal Upper_Force_LS that indicates whether an LS transistor may be forced during operations within an upper current limit range. FIG. 8B includes a waveform 804 of a signal INDUCTOR CURRENT and a waveform 806 of a signal Upper_Force_LS that indicates whether an LS transistor may be forced during operations within an upper current limit range. FIG. 8C includes a waveform 808 of a signal INDUCTOR CURRENT and a waveform 810 of a signal Upper_Force_LS that indicates whether an LS transistor may be forced during operations within an upper current limit range. The power converter circuits of FIGS. 8A, 8B, and 8C have a first current level limit (e.g., HS upper limit level) equal to 5.5 A and a second current level limit (e.g., LS upper limit level) equal to 4.5 A.

Referring now to FIG. 8A, the power converter circuit is operating in a low duty cycle range. The reference signal VIN equals 5.5 V and the voltage of the signal VOUT is 0.3 V. Referring now to FIG. 8B, the power converter circuit is operating in a mid-duty cycle range. The reference signal VIN equals 5.5 V and the voltage of the signal VOUT is 2.5 V. Referring now to FIG. 8C, the power converter circuit is operating in a high duty cycle range. The reference signal VIN equals 3.0 V and the voltage of the signal VOUT is 2.0 V. The waveforms 800, 804, and 808 of the FIGS. 8A, 8B, and 8C, respectively, show the signals INDUCTOR CURRENT remains between an upper value of 5.7 A and a lower value of 4.4 A by forcing the LS transistor to remain on in accordance with the signals Upper_Force_LS. The ability to limit the inductor current on a cycle by cycle basis across a wide duty cycle range enables the power converter circuit to operate within strict tolerances.

Implementing power converter circuits as described above eliminates the number of occurrences of voltage spikes in instances where the power converter circuits operate at high frequencies or have wide duty cycle ranges. Because of the ability to limit a current of an output circuit for applications operating at high frequencies or wide duty cycle ranges, the power converter circuits described above may be utilized in sensor processor powering systems that comply with strict tolerances on a clock cycle by clock cycle (e.g., clock-by-clock) level.

In this description, the term "couple" may cover connections, communications, or signal paths that enable a functional relationship consistent with this description. For example, if device A generates a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal generated by device A. Also, in this description, a value that is "associated with" or that "corresponds to" another value may describe a relationship between the value and the another value. The relationship may be determined using calculations, tables, or any other suitable method, for example. For example, a voltage that is associated with a current may describe a relationship between the voltage and the current such that when the voltage is known, the current may be assumed or vice versa. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

While certain components may be described herein as being of a particular process technology, these components may be exchanged for components of other process technologies. Circuits described herein are reconfigurable to include the replaced components to provide functionality at least partially similar to functionality available before the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor. Also, uses of the phrase "ground voltage potential" in this description include a chassis ground, an Earth ground, a floating ground, a virtual ground, a digital ground, a common ground, and/or any other form of ground connection applicable to, or suitable for, the teachings of this description. Unless otherwise stated, "about", "approximately", or "substantially" preceding a value means+/−10 percent of the stated value.

Modifications are possible in the described examples, and other examples are possible, within the scope of the claims.

What is claimed is:

1. An apparatus, comprising:
a switching regulator circuit having an enable input and a switching output;
an output circuit having a voltage input and a voltage output, the voltage input coupled to the switching output;
a duty cycle comparison circuit comprising a first comparator, the first comparator having a first comparator input and a first comparator output, the first comparator input coupled to the voltage output;
a current comparison circuit comprising:
a second comparator having a second comparator output and second comparator first and second inputs, the second comparator first input coupled to the voltage input and the second comparator second input configured to receive a first reference voltage; and
a third comparator having a third comparator output and third comparator first and second inputs, the third comparator first input coupled to the voltage input and the third comparator second input configured to receive a second reference voltage; and
a switching regulator control circuit having a control output and first, second, and third control inputs, the control output coupled to the enable input and the first, second, and third control inputs coupled to the first, second, and third comparator outputs, respectively.

2. The apparatus of claim 1, wherein:
the first comparator input is a first comparator first input,
the first comparator has a first comparator second input, and
the duty cycle comparison circuit comprises an amplifier circuit having an amplifier input and an amplifier output, the amplifier output coupled to the first comparator second input and the amplifier input configured to receive a reference signal.

3. The apparatus of claim 2, wherein:
the amplifier circuit is a first amplifier circuit,
the switching regulator control circuit has a fourth control input, and
the duty cycle comparison circuit comprises:
a fourth comparator having a fourth comparator output and fourth comparator first and second inputs, the fourth comparator first input coupled to the voltage output and the fourth comparator output coupled to the fourth control input; and
a second amplifier circuit having a second amplifier input and a second amplifier output, the second amplifier output coupled to the fourth comparator second input and the second amplifier input configured to receive the reference signal.

4. The apparatus of claim 3, wherein the switching regulator control circuit has fifth and sixth control inputs and wherein the current comparison circuit comprises:
a fifth comparator having a fifth comparator output and fifth comparator first and second inputs, the fifth comparator first input coupled to the voltage input, the fifth comparator output coupled to the fifth control input, and the fifth comparator second input adapted to receive a third reference voltage; and
a sixth comparator having a sixth comparator output and sixth comparator first and second inputs, the sixth comparator first input coupled to the voltage input, the sixth comparator output coupled to the sixth control input, and the sixth comparator second input adapted to receive a fourth reference voltage.

5. The apparatus of claim 4, wherein the switching regulator control circuit has a seventh control input and further comprising a seventh comparator having a seventh comparator output and seventh comparator first and second inputs, the seventh comparator first input coupled to the voltage output, the seventh comparator output coupled to the seventh control input, and the seventh comparator second input adapted to receive a fifth reference voltage.

6. The apparatus of claim 5, wherein the switching regulator control circuit comprises a current limit indicator circuit comprising:
logic gates having first, second, and third logic outputs and having first, second, third, and fourth logic inputs, the first, second, third, and fourth logic inputs coupled to the second, third, fifth, and sixth comparator outputs, respectively; and
latches having first, second, and third latch inputs, the first, second, and third latch inputs coupled to the first, second, and third logic outputs, respectively.

7. The apparatus of claim 6, wherein:
the current limit indicator circuit has first, second, third, fourth and fifth indicator outputs,
the logic gates are a first set of logic gates, and
the switching regulator control circuit comprises a driver latching circuit comprising:
a first one shot circuit having a first one shot input and a first one shot output, and a second set of logic gates having fourth and fifth logic outputs and a second set of logic inputs, the first one shot input coupled to the fourth logic output, and the second set of logic inputs coupled to the first one shot output, the first comparator output, the seventh comparator output, the first indicator output, and the second indicator output;
a second one shot circuit having a second one shot input and a second one shot output and a third set of logic gates having sixth and seventh logic outputs and a third set of logic inputs, the second one shot input coupled to the sixth logic output, the second one shot output coupled to the first set of logic inputs, and the second set of logic inputs coupled to the first one shot output, the second one shot output, the fourth comparator output, the seventh comparator output, and the third, fourth, and fifth indicator outputs; and
a latch coupled to the fifth and seventh logic outputs.

8. A system comprising:
a power source;
a load; and
a power converter coupled to the power source and the load, wherein the power converter comprises:
a switching regulator circuit having an enable input and a switching output, the switching regulator circuit configured to switch the switching output between a first voltage and a second voltage;

an output circuit having a voltage input and a voltage output, the voltage input coupled to the switching output, and the voltage output coupled to the load and configured to supply a voltage to the load;

a duty cycle comparison circuit comprising a first comparator, the first comparator having a first comparator output and configured to indicate whether a voltage provided at the voltage output exceeds a product of a multiplier and a voltage of a reference signal supplied by the power source;

a current comparison circuit comprising a second comparator, the second comparator having a second comparator output and configured to indicate whether a voltage provided at the voltage input exceeds a first reference voltage, the current comparison circuit comprising a third comparator having a third comparator output and configured to indicate whether the voltage provided at the voltage input is below a second reference voltage; and a switching regulator control circuit having a control output and first, second, and third control inputs, the control output coupled to the enable input, and the first, second, and third control inputs coupled to the first, second, and third comparator outputs, the switching regulator control circuit configured to drive a current of the output circuit between a first current and a second current based on the indications of the first, the second, and the third comparators.

9. The system of claim 8, wherein the first comparator has a first comparator input and the duty cycle comparison circuit comprises a voltage divider circuit having a voltage divider output, the voltage divider output coupled to the first comparator input, the voltage divider circuit configured to generate a signal having a voltage that is the product of the multiplier and the voltage of the reference signal.

10. The system of claim 9, wherein:
the voltage divider circuit is a first voltage divider circuit,
the voltage divider output is a first voltage divider output,
the multiplier is a first multiplier,
the product is a first product,
the duty cycle comparison circuit comprises a fourth comparator having a fourth comparator input and a second voltage divider circuit having a second voltage divider output, the second voltage divider output coupled to the fourth comparator input, the second voltage divider configured to generate a signal having a second voltage that is a second product of a second multiplier and the voltage of the reference signal, and
the fourth comparator is configured to indicate whether the voltage provided at the voltage output exceeds the second product.

11. The system of claim 10, wherein:
the current comparison circuit comprises a fifth comparator having a fifth comparator input configured to receive a third reference voltage and a sixth comparator having a sixth comparator input configured to receive a fourth reference voltage,
the fifth comparator is configured to indicate whether the voltage provided at the input voltage exceeds the third reference voltage, and
the sixth comparator is configured to indicate whether the voltage provided at the input voltage is below the fourth reference voltage; and
the switching regulator control circuit is configured to drive a current provided at the voltage input between a third current and a fourth current based on the indications of the first, the fourth, the fifth, and the sixth comparators.

12. The system of claim 11, further comprising a seventh comparator having a seventh comparator input coupled to a reference voltage source and a seventh comparator output coupled to the voltage output, wherein the seventh comparator is configured to indicate whether a voltage provided at the voltage output exceeds a voltage of the reference voltage source.

13. The system of claim 12, wherein the switching regulator control circuit comprises a current limit indicator circuit comprising:
logic gates having first, second, and third logic outputs, the logic gates configured to determine whether the voltage provided at the voltage output exceeds the first or the third reference voltage and whether the voltage provided at the voltage output is below the second or the fourth reference voltages; and
latches coupled to the first, second, and third logic outputs and configured to indicate whether conditions for switching exist.

14. The system of claim 13, wherein:
the fourth comparator has a fourth comparator output,
the current limit indicator circuit has first, second, third, fourth, and fifth indicator outputs,
the logic gates are a first set of logic gates, and
the switching regulator control circuit comprises a driver latching circuit comprising:
a first one shot circuit having a first one shot input and a first one shot output and configured to generate a first forcing signal;
a second set of logic gates having a first logic output and a second set of logic inputs, the second set of logic inputs coupled to the first and second indicator outputs, to the first comparator output, to the seventh comparator output, to the first one shot input, and to the first one shot output;
a second one shot circuit having a second one shot input and a second one shot output, the second one shot output coupled to the second set of logic inputs, the second one shot circuit configured to generate a second forcing signal;
a third set of logic gates having a second logic output and a third set of logic inputs, the third set of logic inputs coupled to the third, fourth, and fifth indicator outputs, to the first comparator output, to the fourth comparator output, to the second one shot input, the second one shot output, and the first one shot output;
wherein the second and the third sets of logic gates are configured to indicate whether to switch the switching regulator circuit; and
a latch having first and second latch inputs, the first and second latch inputs coupled to the first and the second logic outputs, respectively, the latch configured to drive the voltage provided at the voltage output based on the first, second, third, fourth, and fifth indicator outputs and the first and second forcing signals.

15. An apparatus, comprising:
a switching regulator circuit having a switching output, the switching regulator circuit configured to switch between a first voltage and a second voltage;
an output circuit having a voltage input and a voltage output, the voltage input coupled to the switching output, the output circuit configured to generate an output signal based on the first voltage and the second voltage;

a duty cycle comparison circuit configured to assert a first signal responsive to a voltage provided at the voltage output exceeding a product of a multiplier and a reference signal;

a current comparison circuit configured to:
  assert a second signal responsive to a voltage provided at the voltage input exceeding a first reference voltage; and
  assert a third signal responsive to the voltage provided at the voltage input being below a second reference voltage; and a switching regulator control circuit configured to control the switching regulator circuit based on the first, the second, and the third signals.

16. The apparatus of claim 15, wherein:
the product is a first product,
the multiplier is a first multiplier, and
the duty cycle comparison circuit is configured to:
  determine whether the voltage provided at the voltage output exceeds a second product of a second multiplier and the reference signal; and
  assert a fourth signal based on the voltage provided at the voltage output exceeding the second product.

17. The apparatus of claim 16, wherein the current comparison circuit is configured to:
  assert a fifth signal based on the voltage provided at the voltage input exceeding a third reference voltage; and
  assert a sixth signal based on the voltage provided at the voltage input being below a fourth reference voltage.

18. The apparatus of claim 17, further comprising a voltage feedback circuit configured to assert a seventh signal based on a feedback voltage exceeding a feedback voltage threshold.

19. The apparatus of claim 18, wherein the switching regulator control circuit comprises a current limit indicator circuit configured to:
  determine whether the voltage provided at the input voltage exceeds the first or the third reference voltages or is below the second or the fourth reference voltages; and
  indicate a switching condition of the switching regulator circuit based on the determinations; and
  generate a forcing signal based on the indication.

20. The apparatus of claim 19, wherein the switching regulator control circuit comprises a driver latching circuit configured to generate, based on the indication, a control signal to cause the switching regulator circuit to switch, the control signal having a duration based on a duration of the forcing signal.

* * * * *